United States Patent
Doyle et al.

(10) Patent No.: US 10,822,824 B2
(45) Date of Patent: Nov. 3, 2020

(54) PH BALANCING DISPENSER AND SYSTEM WITH PIERCING OPENER

(71) Applicant: Pentair Water Pool and Spa, Inc., Cary, NC (US)

(72) Inventors: Kevin Doyle, Delray Beach, FL (US); Bruce Johnson, Lighthouse Point, FL (US); Keith Schulte, Parkland, FL (US)

(73) Assignee: PENTAIR WATER POOL & SPA, INC., Cary, NC (US)

( * ) Notice: Subject to any disclaimer, the term of this patent is extended or adjusted under 35 U.S.C. 154(b) by 178 days.

(21) Appl. No.: 16/019,405

(22) Filed: Jun. 26, 2018

(65) Prior Publication Data

US 2018/0305945 A1 Oct. 25, 2018

Related U.S. Application Data

(63) Continuation of application No. 13/712,964, filed on Dec. 12, 2012, now Pat. No. 10,006,214, which is a
(Continued)

(51) Int. Cl.
*C02F 1/66* (2006.01)
*E04H 4/12* (2006.01)
(Continued)

(52) U.S. Cl.
CPC ............ *E04H 4/1281* (2013.01); *C02F 1/66* (2013.01); *C02F 1/008* (2013.01); *C02F 1/76* (2013.01);
(Continued)

(58) Field of Classification Search
CPC .................................................. E04H 4/1281
See application file for complete search history.

(56) References Cited

U.S. PATENT DOCUMENTS

| | | |
|---|---|---|
| 3,351,542 A | 11/1967 | Oldershaw et al. |
| 3,804,253 A | 4/1974 | Wellman et al. |

(Continued)

FOREIGN PATENT DOCUMENTS

| | | |
|---|---|---|
| EP | 0590762 A1 | 4/1994 |
| FR | 2761393 A1 | 10/1998 |

(Continued)

OTHER PUBLICATIONS

CAT Controllers, Inc.; Owner's Manual; Copyright 2005-2008; retrieved from U.S. Patent Office, U.S. Pat. No. 9,416,034; 24 pages.

(Continued)

*Primary Examiner* — Peter Keyworth
(74) *Attorney, Agent, or Firm* — Husch Blackwell LLP

(57) ABSTRACT

A method of adding pH balancing solution to a body of water includes the steps of coupling a pH balancing solution system to a circulation system in communication with the body of water. The pH balancing solution system includes a pH balancing solution dispenser having an upper dispenser body portion, a lower dispenser body portion, an interior support portion with a dispensing grid and a piercing mechanism thereon, and a dispenser lid. The lid of the dispenser is opened and the pH of the balancing solution is inserted inside the upper body portion. The pH balancing solution container is situated on the piercing mechanism and the pH balancing solution container is pierced on the piercing mechanism to open the pH balancing solution container. The open pH balancing solution container is allowed to drain over the dispensing grid. A metered dose of pH solution is dispensed to the body of water through the pH balancing solution system.

20 Claims, 14 Drawing Sheets

Related U.S. Application Data continuation-in-part of application No. 12/320,526, filed on Jan. 28, 2009, now Pat. No. 9,416,034.

(51) Int. Cl.
  C02F 1/00 (2006.01)
  C02F 1/76 (2006.01)
  C02F 103/42 (2006.01)

(52) U.S. Cl.
  CPC ...... *C02F 2103/42* (2013.01); *C02F 2209/06* (2013.01)

(56) References Cited

U.S. PATENT DOCUMENTS

| | | |
|---|---|---|
| 3,867,290 A | 2/1975 | Mackey |
| 3,924,808 A | 12/1975 | Cooley, Jr. |
| 4,002,293 A | 1/1977 | Simmons |
| 4,085,028 A | 4/1978 | McCallum |
| 4,100,052 A | 7/1978 | Stillman |
| 4,136,005 A | 1/1979 | Persson et al. |
| 4,224,154 A | 9/1980 | Steininger |
| 4,244,802 A | 1/1981 | Pohto et al. |
| 4,255,246 A | 3/1981 | Davis et al. |
| 4,265,402 A | 5/1981 | Tsai |
| 4,336,225 A | 6/1982 | Hanford, Jr. et al. |
| 4,381,240 A | 4/1983 | Russell |
| 4,439,295 A | 3/1984 | Richards |
| 4,472,256 A | 9/1984 | Hilbig |
| 4,500,404 A | 2/1985 | Tucker |
| 4,508,687 A | 4/1985 | Houghton |
| 4,519,889 A | 5/1985 | Pellegri et al. |
| 4,599,159 A | 7/1986 | Hilbig |
| 4,657,670 A | 4/1987 | Newton |
| 4,714,534 A | 12/1987 | Fair et al. |
| 4,767,511 A | 8/1988 | Aragon |
| 4,808,290 A | 2/1989 | Hilbig |
| 4,861,451 A | 8/1989 | David |
| 4,889,283 A | 12/1989 | Fuller et al. |
| 4,923,618 A | 5/1990 | Casberg et al. |
| 4,955,540 A | 9/1990 | Fuller et al. |
| 4,992,156 A | 2/1991 | Silveri |
| 5,019,250 A | 5/1991 | Lorenzen |
| 5,027,853 A | 7/1991 | Walko et al. |
| 5,037,519 A | 8/1991 | Wiscombe |
| 5,045,187 A | 9/1991 | Suchanek |
| 5,053,114 A | 10/1991 | Maddock |
| 5,078,320 A | 1/1992 | Fuller et al. |
| 5,124,032 A | 6/1992 | Newhard |
| 5,251,656 A | 2/1993 | Sexton, Sr. |
| 5,218,983 A | 6/1993 | King |
| 5,221,444 A | 6/1993 | Silveri |
| 5,223,822 A | 6/1993 | Stommes et al. |
| 5,239,285 A | 8/1993 | Rak |
| 5,277,802 A | 1/1994 | Goodwin |
| 5,320,748 A | 6/1994 | Dupuis |
| 5,362,368 A | 11/1994 | Lynn et al. |
| 5,427,140 A | 6/1995 | Bosanquet |
| 5,427,658 A | 6/1995 | Allen |
| 5,439,170 A | 8/1995 | Dach |
| 5,468,360 A | 11/1995 | David et al. |
| 5,541,363 A | 7/1996 | Weise et al. |
| 5,567,283 A | 10/1996 | Lynn et al. |
| 5,647,396 A | 7/1997 | Stommes et al. |
| 5,656,771 A | 8/1997 | Beswick et al. |
| 5,687,575 A | 11/1997 | Keville |
| 5,732,619 A | 3/1998 | Hata et al. |
| 5,802,750 A | 9/1998 | Fulmer |
| 5,807,473 A | 9/1998 | Sadler et al. |
| 5,979,791 A | 11/1999 | Kuykendal et al. |
| 5,985,155 A | 11/1999 | Maitland |
| 5,993,669 A | 11/1999 | Fulmer |
| 5,993,753 A | 11/1999 | Davidson |
| 6,076,741 A | 6/2000 | Dandrel et al. |
| 6,096,202 A | 8/2000 | Fulmer |
| 6,125,481 A | 10/2000 | Sicilano |
| 6,238,555 B1 | 5/2001 | Silveri et al. |
| 6,276,612 B1 | 8/2001 | Hall |
| 6,277,288 B1 | 8/2001 | Gargas |
| 6,309,538 B1 | 10/2001 | Khan |
| 6,391,167 B1 | 5/2002 | Grannersberger |
| 6,427,927 B1 | 8/2002 | Hall |
| 6,517,713 B2 | 2/2003 | Gargas |
| 6,551,518 B2 | 4/2003 | Gargas |
| 6,611,114 B1 | 8/2003 | Yen |
| 6,625,824 B1 | 9/2003 | Lutz et al. |
| 6,656,353 B2 | 12/2003 | Kilawee et al. |
| 6,717,383 B1 | 4/2004 | Brunt et al. |
| 6,820,647 B1 | 11/2004 | Grecco et al. |
| 6,938,586 B2 | 9/2005 | Manners et al. |
| 7,061,080 B2 | 6/2006 | Jeun et al. |
| 7,114,637 B2 | 10/2006 | Davis |
| 7,167,087 B2 | 1/2007 | Corrington et al. |
| 7,238,278 B2 | 7/2007 | Coffey et al. |
| 7,291,261 B1 | 11/2007 | Rhodes |
| 2001/0045380 A1 | 11/2001 | Kahn |
| 2002/0035403 A1 | 3/2002 | Clark et al. |
| 2003/0024809 A1 | 2/2003 | Broembsen |
| 2003/0029498 A1* | 2/2003 | King ............... C02F 1/688 137/268 |
| 2005/0016592 A1 | 1/2005 | Jeromson et al. |
| 2005/0137118 A1 | 6/2005 | Silveri |
| 2005/0194296 A1 | 9/2005 | Lin |
| 2006/0027463 A1 | 2/2006 | Lavelle et al. |
| 2006/0054219 A1 | 3/2006 | Sund et al. |
| 2006/0169647 A1 | 8/2006 | Doyle |
| 2006/0243328 A1 | 11/2006 | Bessmertny |
| 2006/0283811 A1 | 12/2006 | Unhoch |
| 2007/0012631 A1 | 1/2007 | Coffey et al. |
| 2007/0207053 A1 | 9/2007 | Doyle et al. |
| 2008/0290039 A1 | 11/2008 | King et al. |
| 2009/0100275 A1 | 4/2009 | Chang et al. |
| 2009/0101593 A1 | 4/2009 | Dresty |
| 2010/0187185 A1 | 7/2010 | Johnson et al. |

FOREIGN PATENT DOCUMENTS

| | | |
|---|---|---|
| FR | 2785898 A1 | 5/2000 |
| JP | 08189217 A | 7/1996 |
| WO | 9628390 A1 | 9/1996 |
| WO | 9840585 A1 | 9/1998 |

OTHER PUBLICATIONS

Richard Kroeger; Lossless power monitoring increases efficiency; 2008 Electronic Products; retrieved from U.S. Patent Office, U.S. Pat. No. 9,416,034; 2 pages.

Solartrope Supply Corporation; AQUA RITE—Chlorinator; Oct. 22, 2004; retrieved from U.S. Patent Office, U.S. Pat. No. 9,416,034; 11 pages.

Chloromatic Salt Water Pool Systems; Owners Manual Model CNR and Echo-Chlor/CNSC Series; retrieved from U.S. Patent Office, U.S. Pat. No. 9,416,034; 10 pages.

\* cited by examiner

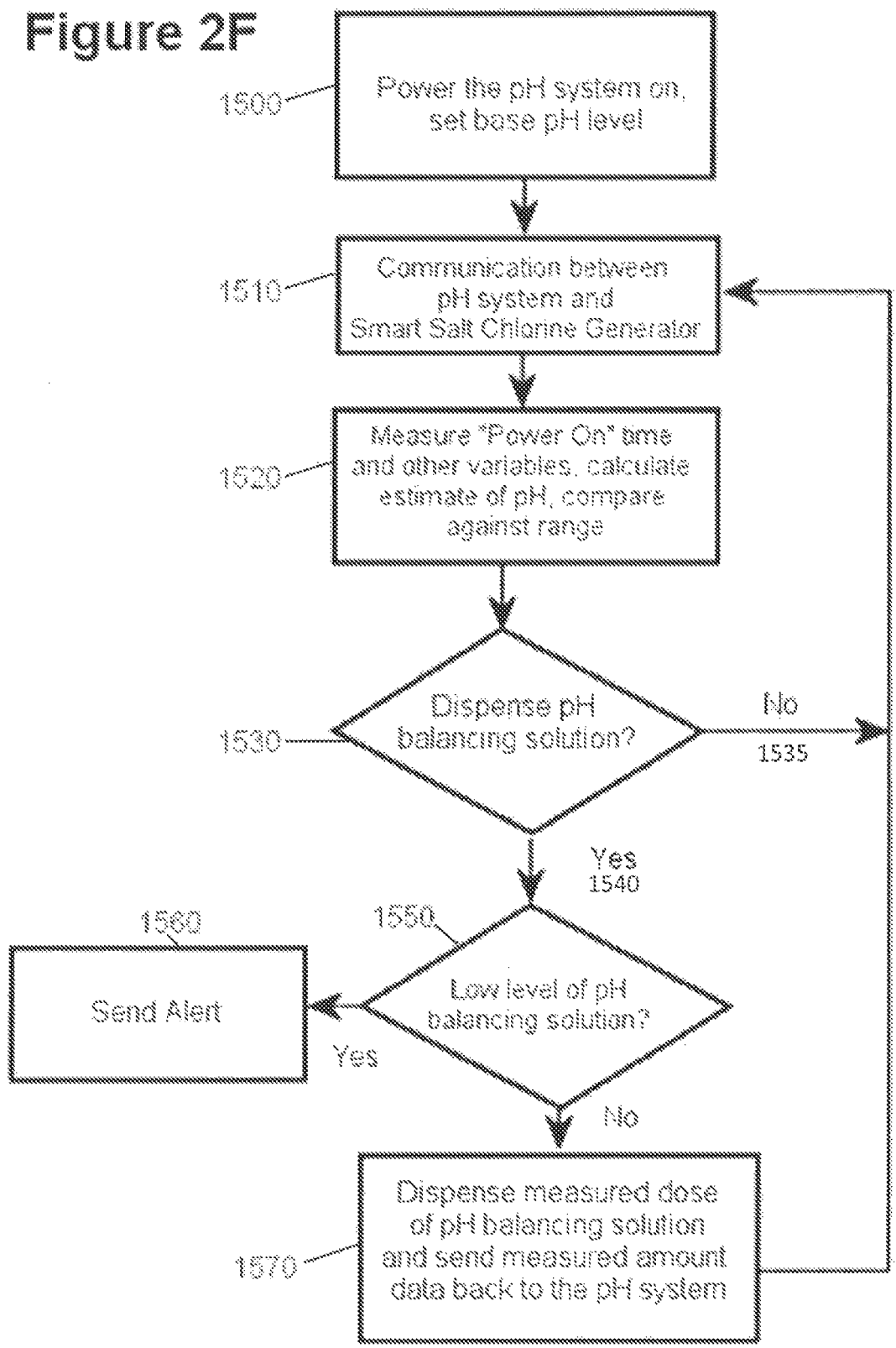

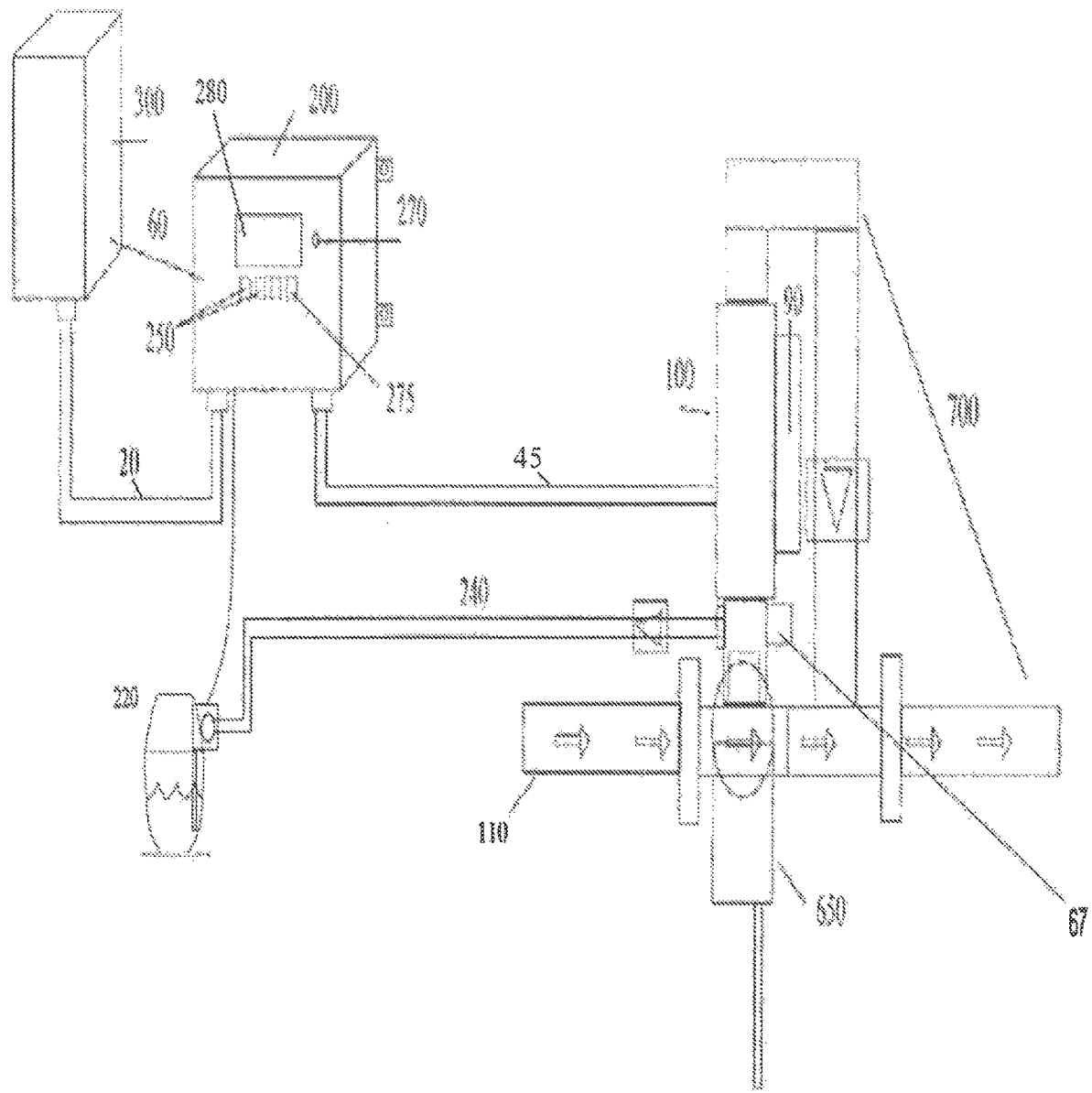

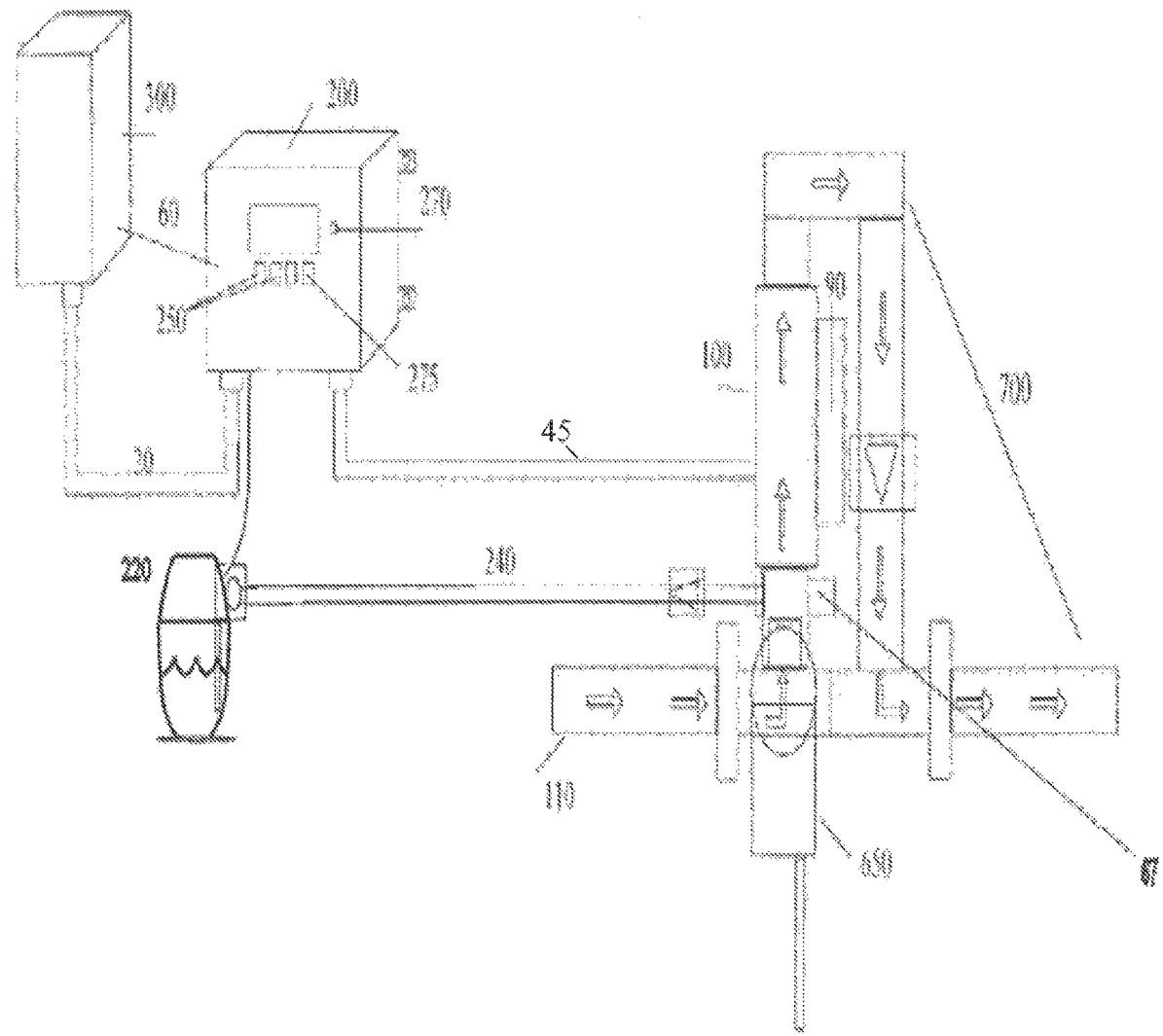

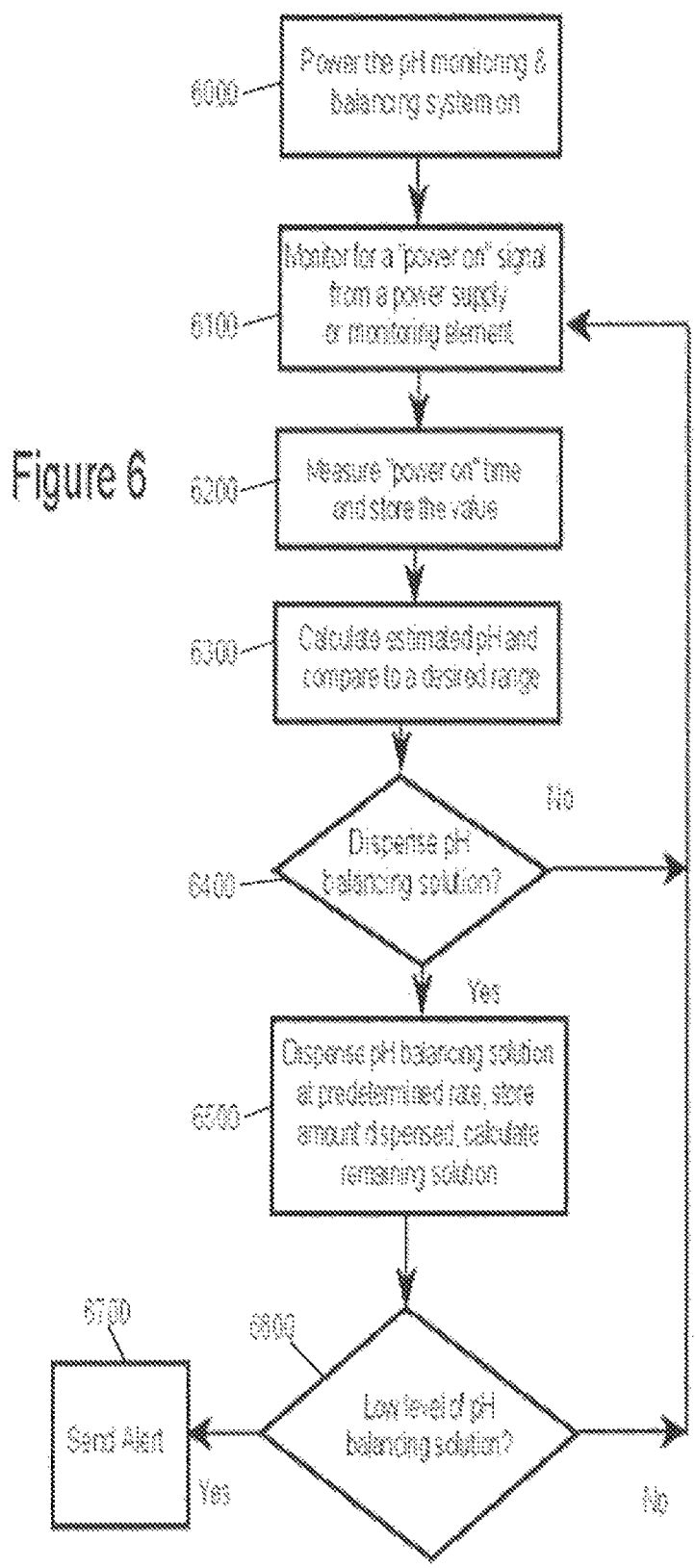

PH BALANCING DISPENSER AND SYSTEM WITH PIERCING OPENER

CROSS-REFERENCE TO RELATED APPLICATIONS

This application is a continuation of U.S. patent application Ser. No. 13/712,964 filed Dec. 12, 2012, which claims priority to U.S. Pat. No. 9,416,034, filed Jan. 28, 2009, and as such, the previous applications are incorporated herein by reference.

BACKGROUND OF THE INVENTION

Field of the Invention

The invention relates to a system for dispensing pH balancing solution in a system controlling the pH balance of a body of water or pool within a given range, for example the chlorine and pH balance of a swimming pool.

Background of the Investigation

Recreational pools such as swimming pools, spas and hot tubs provide a great deal of pleasure and comfort. Similarly, landscaping often incorporates bodies of water for a pleasing aesthetic. The extent of aesthetic beauty or comfort depends on the quality of the water. In order to assure comfort and safety to users of these pools, it is important that the water be treated properly so that it is aesthetically pleasing in terms of taste, color, turbidity and odor. Proper treatment also is important so that the water has proper pH, and is environmentally safe as well as effectively free of pathogens and chemicals which may cause illness. The solutions typically used in balancing the pH of a body of water or pool is characteristically caustic or otherwise hazardous and often need special handling, specifically avoiding contact with the skin for instance.

Many systems have been designed for controlling the chemical balance of swimming pools and the like. Several systems have sought patent protection, including the following:

| patent No. | Inventor(s) |
|---|---|
| 3,804,253 | Wellman et al. |
| 4,224,154 | Steininger |
| 4,381,240 | Russell |
| 4,657,670 | Newton |
| 5,019,250 | Lorenzen |
| 5,277,802 | Goodwin |
| 5,320,748 | Dupuis |
| 6,125,481 | Sicilano |
| 6,309,538 | Khan |
| 7,167,087 | Corrington et al. |
| 7,291,261 | Rhodes |
| 2001/0045380 | Khan |
| 2005/0137118 | Silveri |
| 2005/0194296 | Lin |
| 2006/0283811 | Unhoch |
| 2007/0012631 | Coffey et al. |
| FR 27-85898 | Giroguy |
| JP 81-89217 | Yamagata |

For the most part, simple, inexpensive systems performing this function automatically dispense pre-set amounts of chemicals into the pool at pre-set intervals or through other processes such as salt-chlorine generation. These systems typically require a reservoir of solution. Often, these reservoirs manually filling the reservoir from a bottle of acid or similar substance, exposing the service technician to potential hazard. However, even with these risks, maintaining the chemical balance of a swimming pool is quite important. If the chemical balance departs from a given range, unsanitary conditions will develop permitting algae and bacteria to grow and contaminate the pool. If such conditions exist for long, they may require the pool to be drained and acid washed. Improperly high chlorine or other chemicals and resulting pH levels can cause eye and skin irritations to swimmers, as well as pipe corrosion or scaling to the recirculation system, giving rise to increased operating and heating costs due largely to the resultant inefficiencies.

To operate properly these systems generally require consistent monitoring on the part of the pool owner or maintenance staff to maintain proper operation and proper chemical balance within the pool. Even when properly monitored, in the case of salt chlorine generators, the sanitation process can dramatically change the pH level within the body of water or pool being sanitized. Similarly, conditions such as pool usage, weather, temperature, and other environmental factors can also change the pH balance in the body of water.

The more expensive, elaborate versions of such pool treatment systems can sense the chemical balance of the pool, and dispense chemicals to maintain the pH balance of a pool with a given range. Most use probes or sensors that detect the pH levels at the pool and then dispense acid accordingly. They are generally quite expensive and are plagued with field calibration issues and probe and sensor failure. Moreover, because of their elaborate nature such systems are only economical for large, heavily used pools. Even when used in such pools, they require additional and significant maintenance of the sensors in the pool and the system communicating the readings from these sensors to such systems. Additionally, the application of pH balancing chemicals varies greatly, but most typically requires manually pouring the caustic pH balancing solution into the pool or body of water itself or into the chlorinator. This poses significant risk to maintenance personnel or users of such systems.

There is a need for a safe, reliable mechanism for reducing the potential for contact with the caustic pH balancing solutions in a chemical control system for a swimming pool, one which is relatively simple in construction and durable in operation. Such a system would provide significant safety and a real convenience to the pool owner, reducing maintenance costs and permitting extended periods of operation with little or no need for adjustment or attention and simplifying the maintenance of the acid balancing systems. The system described herein meets these objectives, as well as other objectives which will be apparent to those skilled in the art upon reading the following detailed description.

SUMMARY OF THE INVENTORY

An object of the invention is to provide a pH balancing solution dispensing system accurately dispensing pH balancing solution into a body of water or swimming pool pH balancing system or as a part of a larger chlorination system without the need to expose the user or maintenance personnel to the caustic pH balancing solution.

A further object of the invention is to provide a pH balancing system accurately dispensing pH balancing solution into a swimming pool based on the chlorine production run time of a chlorine generator.

Another object of the invention is to provide a pH balancing system that operates on detection of power output to a cell and then computes acid demand from chlorine production for the chlorine generator for that period of time.

A still further object of the invention is to provide a pH balancing system which adds acid at predetermined intervals based on either "pump on time" or each time the pump is turned on, making a calculation of generated chlorine based on a sensed run time for a chlorine generator.

The invention includes an apparatus and a method of operating the apparatus.

The apparatus of the invention includes a pH balancing solution dispenser having an upper body portion and a lower dispenser body portion. An interior support portion with a dispensing grid and an at least one piercing mechanism thereon is provided. A dispenser lid an at least one dispensing mechanism are also provides such that a container of pH balancing solution is placed within the upper body portion and situated in communication with the piercing mechanism, the container is pierced and opened and the pH balancing solution flows from the container through the dispensing grid and is stored for distribution by the at least one dispensing mechanism.

The dispensing mechanism can be at least one of: an at least one peristaltic pump, a venturi feed system, an at least one diaphragm pump, and an at least one gravity feed tube. The dispenser can further comprise a chlorinator and a dispenser controller, the dispenser controller having a timer and an at least one programmable interface, wherein the output of the dispenser is managed by the chlorinator or the dispenser controller based on an at least one variable input to the dispenser controller. The at least one variable input to the controller can include manual input of variables describing the output of the chlorinator and the size of a pool or body of water served by the chlorinator. The controller can further comprise a timer, the timer controlling the dispensing of the pH balancing solution from the dispenser. The controller can further comprise a switch, the switch shutting the power to the chlorinator off when the dispenser is operational and resetting the timer. The dispenser can further include a wired or wireless connection coupling the controller and the dispenser such that the at least one variable input to the controller is transmitted through the coupling.

The apparatus of the invention further includes a pH balancing solution dispensing system supplying a salt chlorine generator system serving a body of water, the salt chlorine generator system having an on or operational state and a non-operational state, wherein when in the operational state the salt chlorine generator system produces chlorine through an electrolytic process at a salt chlorine generator cell in communication with a flow of water from the body of water, the pH balancing solution dispensing system comprising. A pH monitoring and balancing unit can be coupled to the salt chlorine generator system with a pH monitoring and balancing unit controller measuring the time the salt chlorine generator system is in the operational state and calculating an estimated pH adjustment requirement for the body of water being served by the salt chlorine generator system based in at least part on the measured time the salt chlorine generator is in an operational state. A pH balancing solution dispenser having an upper dispenser body portion, a lower dispenser body portion, an interior support portion with a dispensing grid and a piercing mechanism thereon, and a dispenser lid, wherein a pH balancing solution container is put inside the upper body portion and situated on the piercing mechanism to open the container and the dispenser, in communication with the controller, dispensing a specifically metered dose of pH solution when instructed by the pH monitoring and balancing unit controller to balance the pH of the body of water based on the estimation made by the pH monitoring and balancing unit controller using the measured operational time and reporting the dispensed amount back to the pH measuring and balancing controller to update the estimate of the pH of the body of water.

The pH balancing solution dispensing system can further include a salt chlorine generator system controller monitoring the functions of the salt chlorine generator cell and its functions in producing chlorine through an electrolytic process and communicating with the pH monitoring and balancing unit controller. The pH balancing solution dispensing system can further comprise a smart power supply coupled to the salt chlorine generator system and the pH monitoring and balancing unit, the smart power supply monitoring the power drawn by the salt chlorine generator system and thereby measuring the time the salt chlorine generator system is in the operational state and reporting this to the pH monitoring and balancing unit controller.

The pH balancing solution dispensing system can further comprise an at least one dispensing mechanism, the dispensing mechanism dispensing the pH balancing solution into the body of water. The dispensing mechanism can be located in the salt chlorine generator system. The dispensing mechanism can also be located externally from the salt chlorine generator system. The dispensing mechanism can be at least one of a dispensing pump, a peristaltic pump, a venturi feed system, a diaphragm pump, and a gravity feed tube. The salt chlorine generator system and the pH monitoring and balancing unit can be coupled via a communications link. The salt chlorine generator system and the pH monitoring and balancing unit can be coupled via a communications link to a master controller. The pH balancing solution dispensing system can include an adjustment device to adjust the rate at which the pH balancing solution can be dispensed depending on the specific variables of the pool or body of water. The pH balancing solution dispensing system can also include a programmable interface screen.

The pH balancing solution dispensing system of claim can further include software on the pH balancing and monitoring unit controller is programmed through the programmable interface screen with at least one variable to adjust for the dispensing rate for at least one of the type of smart salt chlorine generator, the output of smart salt chlorine generator, the volume of the body of water, and the amount of use the body of water receives.

The method of the instant invention includes a method of adding pH balancing solution to a body of water, the method comprising coupling a pH balancing solution system to a circulation system in communication with the body of water coupled to a chlorinator, the pH balancing solution system including a pH balancing solution dispenser having an upper dispenser body portion, a lower dispenser body portion, an interior support portion with a dispensing grid and a piercing mechanism thereon, and a dispenser lid; opening the lid of the dispenser and inserting a pH balancing solution container inside the upper body portion; situating the pH balancing solution container on the piercing mechanism and piercing the pH balancing solution container on the piercing mechanism to open the pH balancing solution container; allowing the open pH balancing solution container to drain over the dispensing grid; and dispensing a metered dose of pH solution to the body of water through the pH balancing solution system.

The method can further comprise programming a controller to establish an initial pH for the body of water and programming a controller with variables for a statistical estimation of the quantity of chlorination performed by the chlorinator. The variables can include at least one of a volume of the body of water, the chlorine output of the chlorinator model, the make and model of the chlorinator, the base chlorine outputs of the chlorinator, the operation time of the pH monitoring and balancing unit, the operation time of the chlorinator, dispensing device status, sunlight hours, voltage, average power variance, measured dosage of pH balancing solution dispensed, a measured rate of dispensing pH balancing solution, water temperature, air temperature, measured precipitation, and a timer.

The method of the instant invention includes a method of operating a pH balancing system for controlling pH balance of a body of water, the method comprising: the method comprising: coupling the pH balancing system to a chlorinator so that a controller of the chlorinator is in communication with the pH balancing system; measuring an operational time of the chlorinator; calculating a pH of the body of water based at least in part on the measured operational time of the chlorinator; comparing the pH of the body of water to a preset range to determine whether the pH of the body of water falls within the preset range; dispensing a metered dose of the pH balancing solution to the body of water when the pH of the body of water falls outside of the preset range; and communicating the dispensed amount of the pH balancing solution to the pH balancing system. The pH of the body of water is continuously calculated until the pH of the body of water falls outside the preset range. The chlorinator produces chlorine through electrolysis.

The method can further include the pH balancing system and the controller store and send performance and operational parameters to each other. The performance and operational parameters include at least one of a volume of the body of water, a chlorine output of the chlorinator model, a make and model of the chlorinator, a base chlorine output of the chlorinator, an operation time of the pH monitoring and balancing unit, an operation time of the chlorinator, dispensing device status, sunlight hours, voltage, average power variance, measured dosage of pH balancing solution dispensed, a measured rate of dispensing pH balancing solution, water temperature, air temperature, measured precipitation, and a timer.

The method can further comprise calculating a level of pH balancing solution prior to dispensing the metered dose of the pH balancing solution and sending an alert if the level of pH balancing solution falls below a threshold amount.

The method can further comprise recalculating the pH of the body of water following the dispensing of the metered dose of the pH balancing solution; and comparing the recalculated pH to the preset range to determine whether the recalculated pH falls within the preset range.

The method can further comprise dispensing a second metered dose of the pH balancing solution; and communicating the dispensed amount of the pH balancing solution to the pH balancing system.

The method of the instant invention includes a method of operating a pH balancing system for a body of water, the method comprising: coupling a power supply controller of the pH balancing system to a chlorine generator and a monitoring unit to monitor a power consumption of the chlorine generator, the chlorine generator including a controller in communication with the pH balancing system; adjusting the pH balancing system to set a first metered dose of a pH balancing solution; providing power to the chlorine generator; monitoring the chlorine generator for a power on signal indicating that the chlorine generator is operational; measuring an operational time of the chlorine generator using the monitoring unit; calculating a pH of the body of water based at least in part on the measured operational time of the chlorine generator; comparing the pH of the body of water to a preset range to determine whether the pH of the body of water is within the preset range; dispensing a second metered dose of the pH balancing solution to the body of water when the pH of the body of water falls outside of the preset range to balance the pH of the body of water; and communicating the dispensed amount of the pH balancing solution to the pH balancing system. The first metered dose of the pH balancing solution is set to zero. The pH of the body of water is continuously calculated until the pH of the body of water falls outside of the preset range.

The method can further comprise calculating a level of pH balancing solution prior to dispensing the metered dose of the pH balancing solution and sending an alert if the level of pH balancing solution falls below a threshold amount.

The method can further comprise recalculating the pH of the body of water following the dispensing of the second metered dose of the pH balancing solution; and comparing the recalculated pH to the preset range to determine whether the recalculated pH falls within the preset range.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 2F provides a flow chart showing an exemplary method of operating an embodiment of the instant invention FIG. 3A shows a plan view of a further exemplary embodiment of the instant invention including a salt-chlorine generator cell blade cleaning feature in a closed operating position to allow for cleaning.

FIG. 3B shows a plan view of a further exemplary embodiment of the instant invention including a salt-chlorine generator cell blade cleaning feature in an open operating position where the chlorinator is operating to produce chlorine through electrolysis.

FIG. 6 is a flow chart describing an exemplary method of operating an embodiment of the instant invention.

DETAIL DESCRIPTION OF THE INVENTIONS

The instant invention provides a distribution system that does not allow for exposure of the hazardous, concentrated pH balancing solution to the user or technician adding the solution. The system uses a canister that provides a unique safety grid to protect chemical contents from being touched when exiting a container. Incorporated into the safety grid is a piercing mechanism. The piercing mechanism allows the user or technician to simply depress the bottle into the containment vessel which will simultaneously pierce the safety cover allowing the chemical to flow freely into the canister.

Additionally, in an exemplary embodiment the distribution system is a part of a chlorination system that uses the measurement of the chlorine generator cell (CGC) or chlorine generator (CG) hours of operation or "run time" to compute how much pH balancing solution to dispense into the pool. This is a unique, consistent, inexpensive, but reliable method to solve the issue of automating pH compensation. Together with the distribution system, the overall chlorination system provides a significantly easier to operate, lower maintenance, safer chlorination system that properly balances pH.

To make chlorine from salt water with an electrolytic or salt-chlorine generator cell (SCGC) such as that shown in U.S. Pat. No. 7,695,613 marketed as the INTELLICHLOR system, an electrolysis plate causes chlorine to separate from a salt molecule. The chemical reaction that occurs inside the cell is slightly basic which makes the pool or bodies of water tend to have a pH in, for example, the range of 7.8 to 8.2. The recommended level for pH in a pool is, for example, generally 7.2 to 7.6. If the pool pH rises above the top end of the range, the sanitizing effectiveness of the chlorine produced by the salt-chlorine generator can be greatly reduced. For example, if the pH level in a body of water or pool is 7.2 the chlorine from the chlorination of the SCG is approximately ten times more effective than the same amount of chlorine in a pool with a pH of 8.2.

Likewise, the pool water at the higher pH levels can create irritated eyes and strong chemical smells. Adding acid on a regular basis keeps the pool in balance. This creates the best water chemistry and increases the life of the chlorine cell due to the increased efficiency of the chlorine produced thus allowing the cell to run at lower settings extending cell life. It is therefore desirable to automate the pH balancing of the water chemistry for a swimming pool by providing a simple, easily maintained, automated pH dispensing system.

Figure 1:
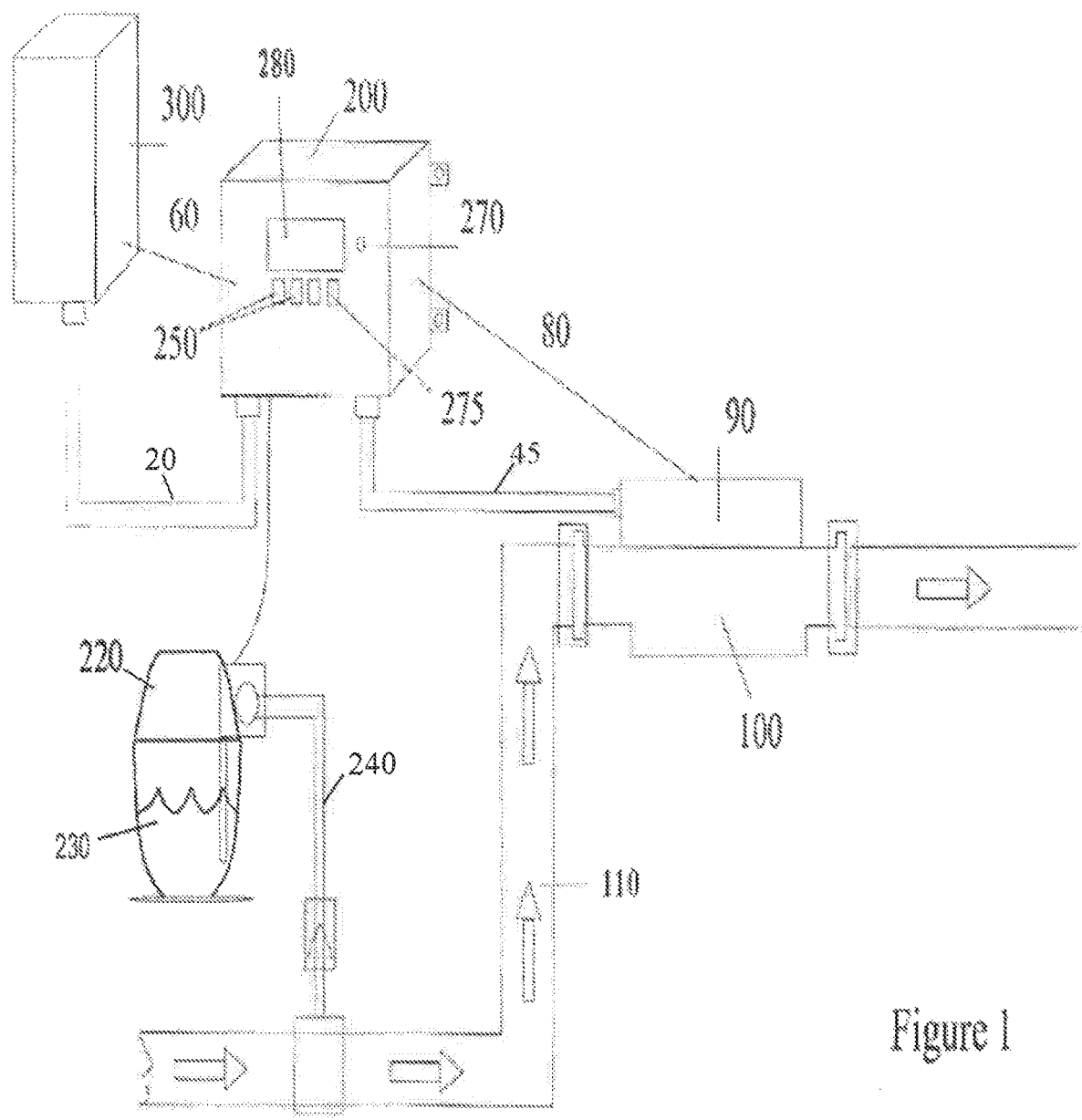
FIG. 1 shows a plan view of an exemplary embodiment of the invention.

FIG. 1 shows a plan view of an exemplary embodiment of the invention. The most recent advances in salt chlorine generation systems have produced feature rich systems with multiple internal sensors. At the heart of such systems is a smart salt chlorine salt generator cell (SmSCGC) 100 which can typically include a PC board, a display, and a user interface with, for example, buttons and indicator lights (not shown). A smart salt chlorine generator cell controller 90 is provided and can communicate with the pH monitoring and balancing unit or pH monitoring and dispensing unit 200. This can be done wirelessly or through a wired connection 60, 80, such as an RS-485 line. The smart salt chlorine generator cell controller 90 monitors the functions of the smart salt chlorine generator cell 100 and its functions in producing chlorine through an electrolytic process.

For the SmSCGC system shown, the pH monitoring and balancing unit 200 is plugged in via an existing quick disconnect power plug 20 into the SmSCGC power center 300 where the SmSCGC 100 is normally installed and powered. The SmSCGC 100 is plugged in via a similar quick disconnect plug 45 on the pH monitoring and balancing unit 200 or via a similar quick disconnect plug into the SmSCGC power center 300. The pH monitoring and balancing unit 200 then becomes part of the overall SmSCGC system. A dispensing mechanism 220 is located in or externally from the pH monitoring and balancing unit 200, shown in this example as, but is certainly not limited to, a dispensing pump. The dispensing mechanism 220 can be for instance a peristaltic pump, but it can also include any other type of dispensing mechanism or mechanisms, such as venturi feed systems, diaphragm pumps, gravity feed tubes, and the like that provide the necessary dispensing of the pH balancing solution 230, shown in a container 150, in a metered manner. Further detail of the dispensing mechanism 220 is shown in FIGS. 2A-2D and fully described herein below. The details and specific nature provide for a dispensing mechanism 220 that provides an improved manner for dispensing the pH balancing solution 230 from the pH balancing solution container and increasing overall system safety.

The power for the electronics of the monitoring and balancing unit 200 and the dispensing device 220 can come from the same power that typically powers the SmSCGC 100 in the exemplary embodiment shown. Alternatively, they may be operated from different power sources or connected via different methods, but the measurement or monitoring of power or "on time" of the SmSCGC 100 is preferably measurable by the pH monitoring and dispensing unit controller 210 or otherwise communicated to the pH monitoring and balancing unit 200. However, as noted below, a further exemplary embodiment can utilize a less sophisticated system with a timer instructing the dispensing mechanism as shown and described below in relation to FIG. 7.

The in line installation of the SmSCGC 100 also allows the pH monitoring and balancing unit 200 to access and communicate with the power center 300 and the SmSCGC 100 and the SmSCGC controller 90 with a communication link(s) 60, 80 that go to the cell and out to other equipment such as an in house, i.e. external, control system or display or other devices (not shown). This can also be accomplished wirelessly through transceivers in the units and following suitable communications network protocols, e.g. Bluetooth, RF, and the like. This allows the pH monitoring and balancing unit 200 to "talk" or communicate to the cell 100 and query it for various pieces of information and similarly communicate this information out to other devices. This information can include, but is not limited to, what model of SmSCGC 100 it is, the elapsed time since its last communication, whether the SmSCGC has produced or is producing chlorine, status of the salt level, status of the pH balancing liquid, total operational time, and the like.

By obtaining the hours of use or time of operation or operational time or "run time" from the smart salt chlorine generator cell 100 or the measurement of the power consumption by the cell and correlating that to the time of operation or similar techniques for measuring hours of operation, the controller 210 can then compute an estimate for the current pH of the body of water being serviced by the smart chlorinator system. Based on this, further calculations by the controller 210 determine how much pH balancing solution is required to re-balance the pool to a desired pH range. This can be done, for example, through the use of lookup tables or through a mathematical representation of the change in pH created by the chlorination, for example through an electrolysis process, per minute and then calculating this change for the time of operation or "on time" of the chlorinator or through a statistical computation model based on, for example but certainly not limited to, the volume of the pool and the model of the chlorinator. It is also possible to utilize a statistical method of calculation based on a set of variables, for instance the body of water or pool volume and the output of the chlorinator model, to operate the pH monitor and balancing unit 200. This is done with or without a smart chlorine generator, as described herein below with respect to FIG. 5B and FIG. 7. In all cases, manual adjustments could be made based on initial pre-programmed dispense rates which utilize scaling dispense rates for initial programmed parameters. Since the dispensing devices 220 are precise in their dispense rate, the proper amount of pH balancing solution 230 can be pumped or dispensed from, for example but certainly not limited to, a standard one gallon bottle of muriatic acid into the pool through a fitting down a line 240 into the return plumbing line 110 as shown or alternatively the pH dispensing unit and method described in FIGS. 2A-2F. A typical gallon of acid lasts approximately 30 to 60 days depending on chlorine demand and pool size. When the container with the pH balancing solution reaches a low level an alert can be sent and LED 270 can be lit to indicate the low level of solution remaining.

In a further exemplary embodiment, in addition to the above where the dispensing unit 220 is equipped to share the power system of the salt chlorination system 100, it also optimizes power usage. To allow for this shared power source and to optimize power usage, communications from the pH balancing solution dispensing unit or mechanism 220 are sent to the salt chlorinator generator 100 temporarily turning off the salt chlorine generator 100. The pH balancing solution dispensing unit or mechanism 220 and/or controller 210 retains all settings on the salt chlorine generator 100 when power is restored after dispensing is completed.

In an exemplary embodiment, it is also desirable, though not necessarily a requirement, for the pH monitoring and balancing unit 200 to "inject" or dispense this pH balancing solution 230, in this case muriatic acid, upstream of the smart salt chlorine generator cell 100 which will allow the acid to help "clean" the cell blades and extend their life. The pH monitoring and balancing unit 200 can also store the total amount of pH balancing solution 230 that has been dispensed by communicating with the dispensing device 220. In this way, the pH balancing monitoring and balancing unit 200 can indicate to the pool owner or maintenance staff when the pH balancing solution 230 is close to empty so they can service it. After additional pH balancing solution is added, the pH monitoring and balancing unit 200 can reset the measurement through programming in the controller 210 or manually through a button(s) 275 to allow the total to be reset to zero to allow the dispensing process to remain accurate.

In the exemplary embodiment shown, the dispense rate for the pH monitoring and balancing unit 200 is set by default based on an average 20,000 gallon pool. The pH monitoring and balancing unit 200 is equipped with an adjustment device 250 that allows the average dose to be lowered or raised depending on the size of the pool or the pH solution demand. The owner or maintenance staff monitors the pH after operation and either lowers or raises the dispense rate depending on the specific variables of the pool or body of water. The adjustment can be facilitated through adjustment device 250 that can include button(s) 275 and/or programmable interface screen 280. In addition to the adjustment of the amount of pH balancing solution 230 to be dispensed, a programmable interface screen or touch screen 280 through software on the pH balancing and monitoring unit controller 210 could also be programmed for the type of SmSCGC, pool size, amount of use, and other relevant variables. Alternatively or in conjunction with this input, existing sensor technologies or sensors in the SmSCGC can be used within the system to sense the pH and adjust automatically. This feature allows the user to compensate and customize their system for their pool requirements.

In addition to "polling" or communicating with the smart salt chlorine generator cell 100 and dispensing the proper amount of pH balancing solution 230, pH monitoring and balancing unit 200 can further communicate, for instance via the RS 485 or other wired or wireless protocol, to other controls or controllers (not shown) its operational parameters and additional information. For example, the total amount of acid dispensed can be communicated as well as the level of the remaining acid, performance parameters or other relevant information or variables pertaining to the pH monitoring and balancing unit 200, such as hours of operation, dispensing device status, and the like.

Figure 2A:
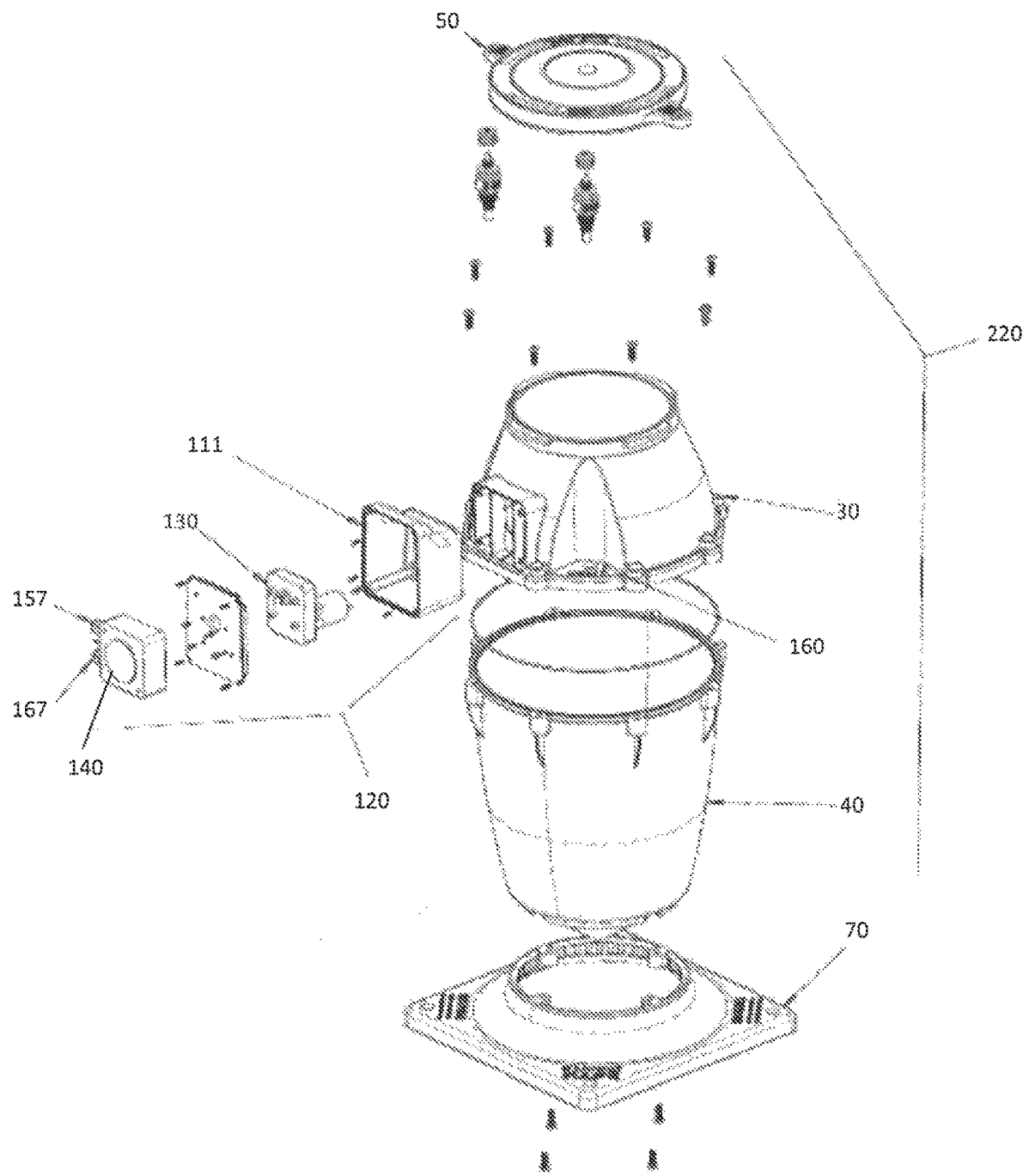
FIG. 2A shows an exploded view of an exemplary embodiment of a dispensing mechanism.

FIG. 2A shows an exploded view of an exemplary embodiment of the dispensing mechanism shown in FIG. 1. The exemplary embodiment of the dispensing mechanism 220 as shown in FIG. 1 includes an upper body portion 30, a lower body portion 40, and a cap assembly portion 50. The body rests atop a mounting plate 70. A pump 120 is contained within a pump housing 111 within the body and includes a controller 130 and interface 140. There is a pump input 157 and a pump output 167 provided on the side of the pump housing 111. The pH balancing solution 230, as shown in FIG. 1, is pumped through the pump 120 up from the lower body portion and into pump 120 through the pump input 157 and then out of the pump output 167 and into the water return line 110. Additionally, an at least one adjustment mechanism 160 is provided, here a valve to relieve pressure built up in the dispensing mechanism 220 as necessary.

Figure 2B:
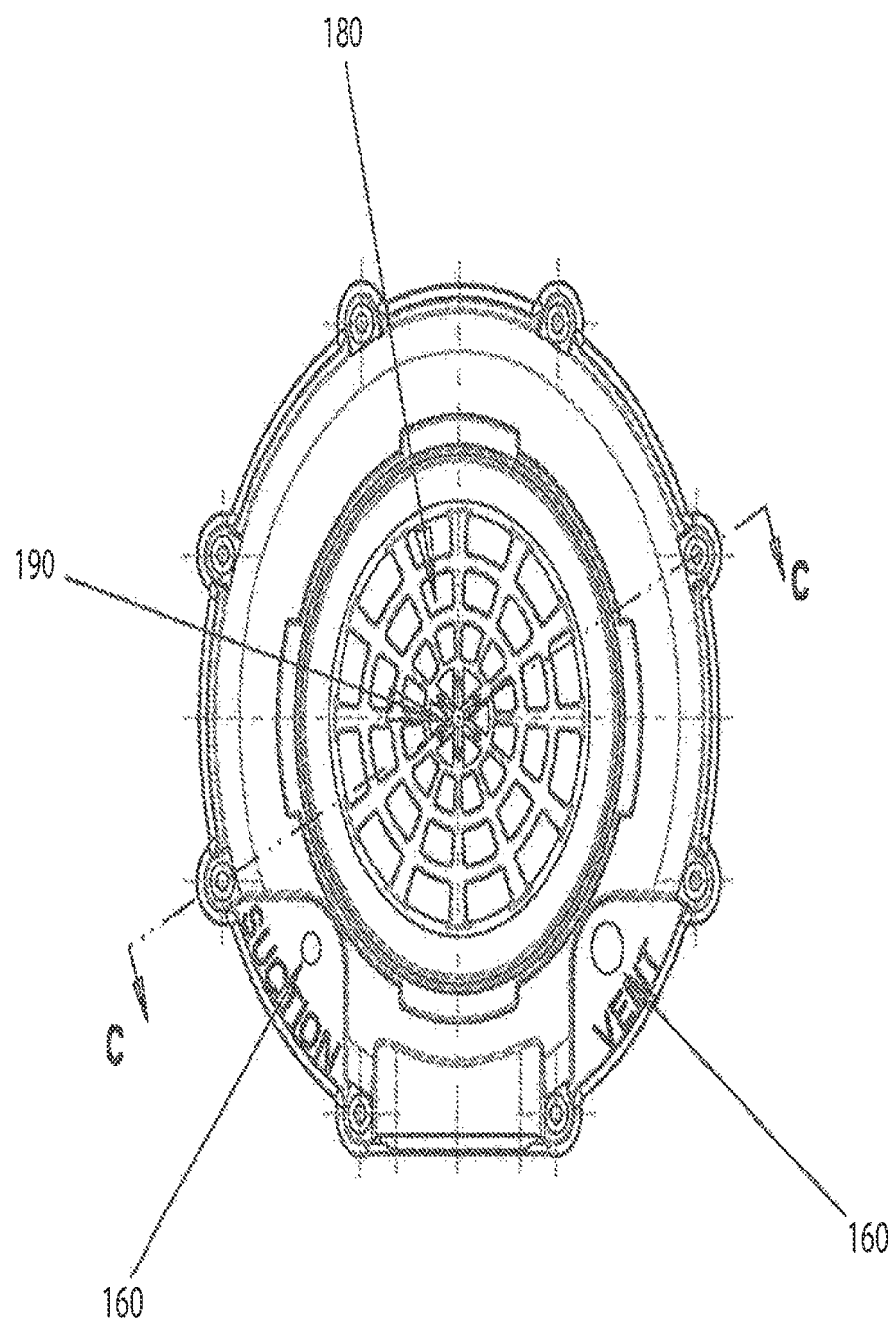
FIG. 2B shows a top view of the exemplary embodiment of a dispensing mechanism of FIG. 2A.
Figure 2C:
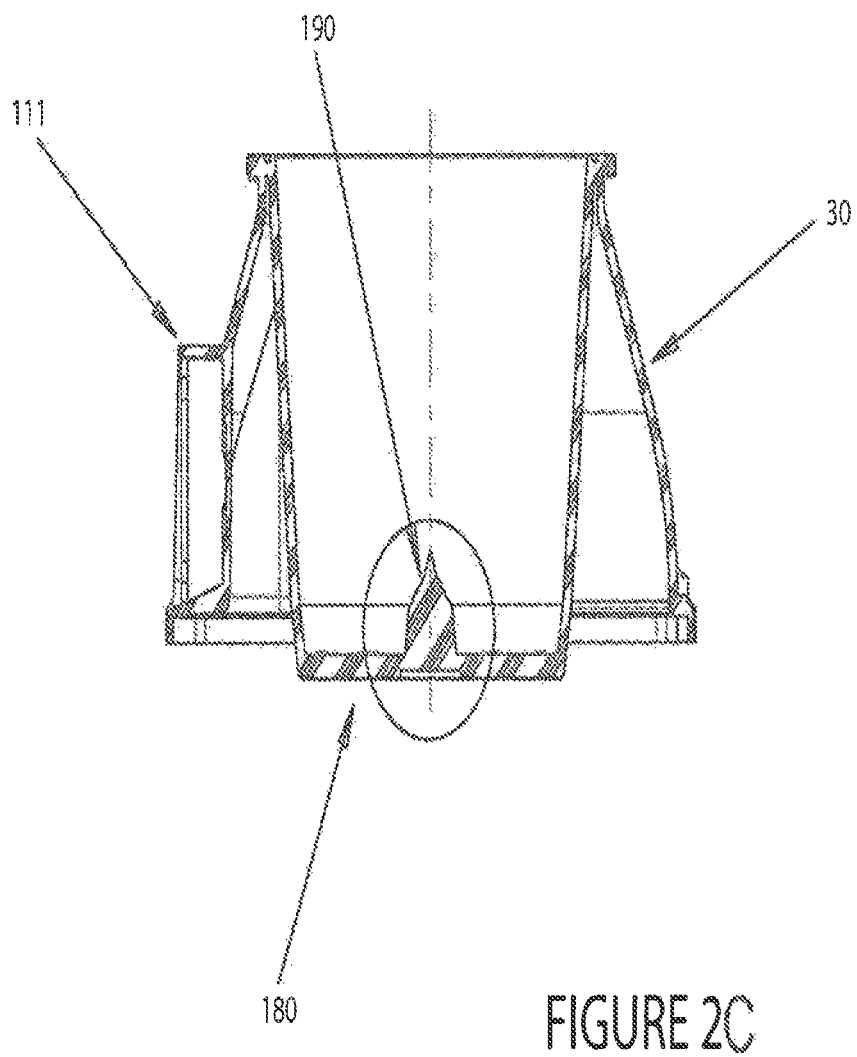
FIG. 2C shows a cross sectional view of FIG. 2B along the cross sectional line C-C.
Figure 2D:
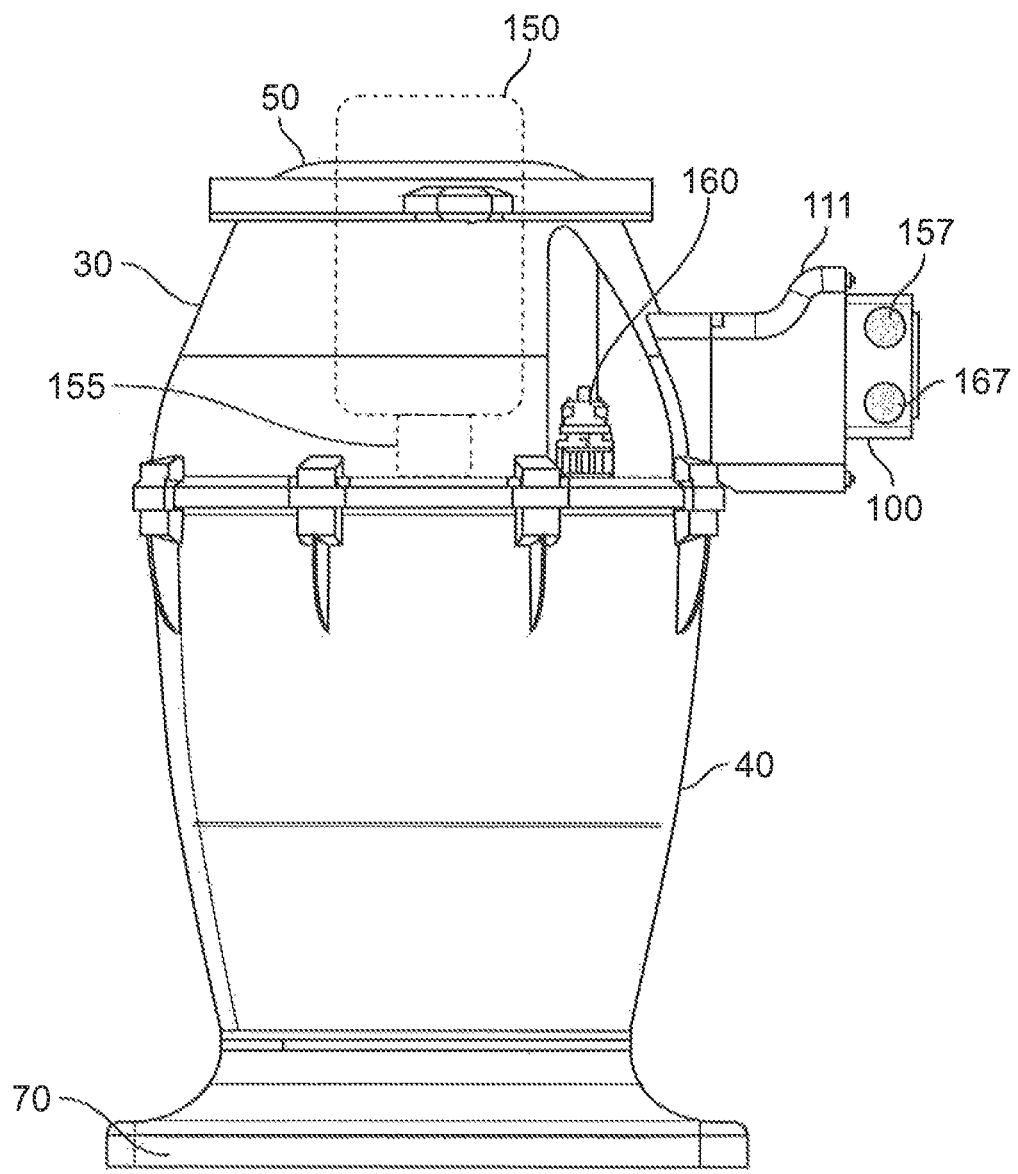
FIG. 2D shows a further side view of an exemplary embodiment of a dispensing mechanism.

In operation, the cap assembly portion 50 is removed and a technician or user inserts a container 150 with a foil or similar cover 155, seen most clearly in FIG. 2D, into the dispensing mechanism 220. The container 150 is thus located above a piercing element 190, as more substantially disclosed herein below with respect to FIG. 2D. The piercing element 190, in one embodiment, is thus thrust into the container 150 and pierces the foil 155. This permits the pH balancing solution 230 to flow out onto a dispensing grill 180. This fills the lower container portion 40 and allows the pump 120 to pump the solution to the dispensing system, like that shown in FIG. 1. Alternatively, in another exemplary embodiment, the user or technician can simply turn the cap assembly portion 50 and thereby push the container 150 down to engage the piercing element 190 and thereby permit the pH balancing solution 230 to flow out into a dispensing grill 180.

FIG. 2C provides a further cross-sectional view and FIG. 2B provides a top view of the dispensing mechanism shown in FIG. 2A. As seen in the cross-sectional view, the upper body portion 30 contains the piercing element 190 which is mounted atop a dispensing grid 180. The top view shows the piercing element 190 centrally located atop the dispensing grid 180. In further embodiments the piercing element 190 can be varied to suit the container design and it is contemplated that multiple elements and further guide elements may be used in conjunction with the piercing element to further guide and support the container within the lower housing without departing from the spirit of the invention. It is also provided that the container may be retained within the body portion or removed to be disposed of after being completely emptied. The pH balancing solution 230 flows through the dispensing grid 180 and into the lower body portion of the dispensing unit 220. In an exemplary embodiment, the lower body portion 40 of the dispensing unit 220 is clear, see through, or has a clear portion to measure the amount of remaining pH balancing solution. In further exemplary embodiments, an LCD indicator or similar device may be included as an indicator element to indicate a remaining value or volume or low value or volume of pH balancing solution 230 within the dispensing mechanism.

FIG. 2D provides a further side view of an exemplary embodiment of a pH balancing solution dispenser with the pH balancing solution container shown in shadow within the container. The dispensing mechanism 220 is shown with the assembled upper and lower body portions 30, 40 affixed to the mounting plate 70. The pump housing 111 is clearly visible with the pump 120 contained therein. Pump input 157 and pump output 167 are also clearly visible. In shadow, the pH balancing solution container 150 is shown. In this embodiment the cap assembly portion 50 is left off while the container drains. The dispensing grid 180 is also shown in shadow.

Figure 2E:
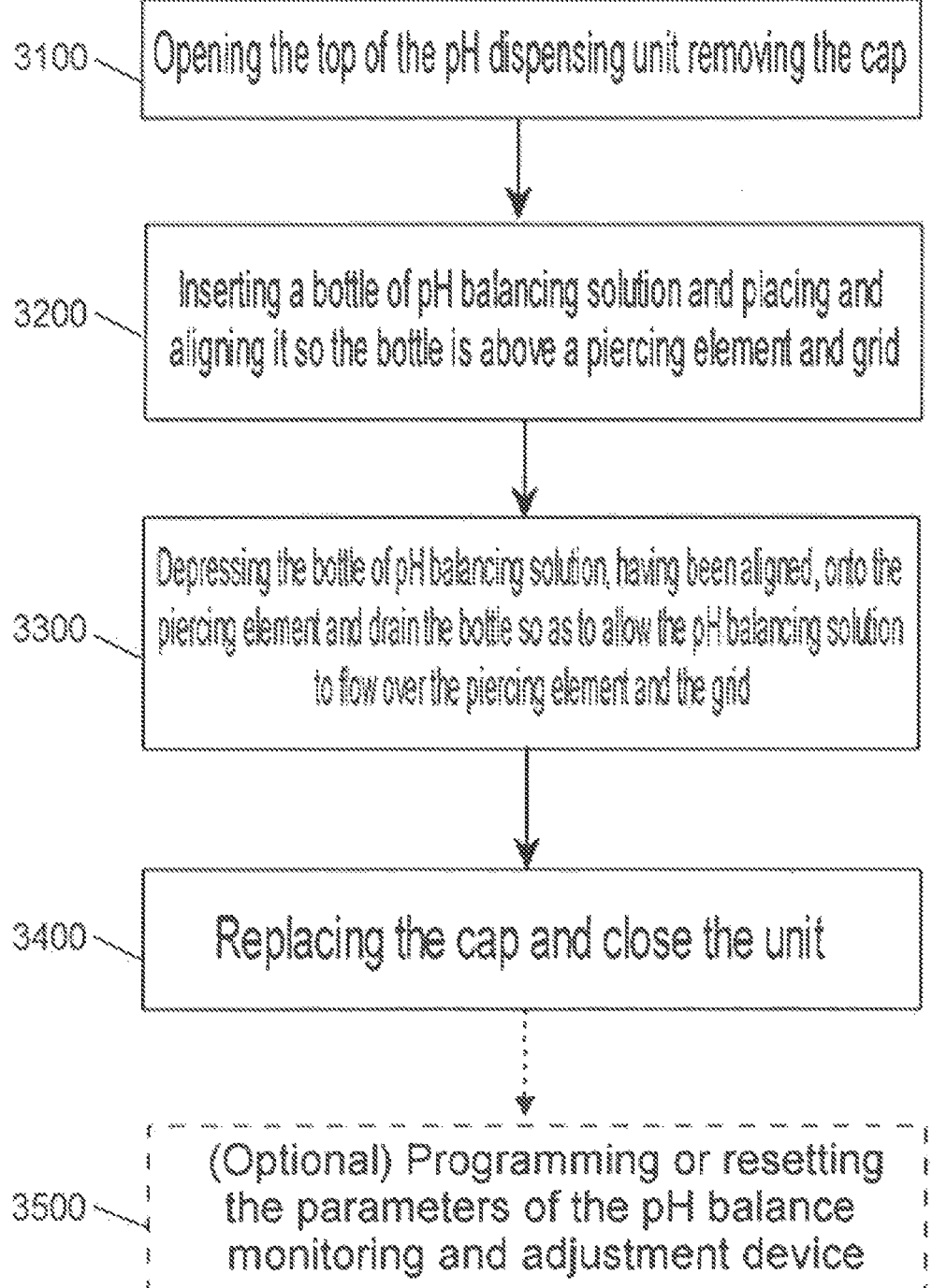
FIG. 2E provides a flow chart showing an exemplary method of deploying pH balancing solution in an embodiment of the instant invention.

FIG. 2E provides a flow chart showing an exemplary method of deploying pH balancing solution in an embodiment of the instant invention. In a first method step, 3100 the top of the pH dispensing unit is opened. A bottle of pH balancing solution is inserted in step 3200, as shown in FIG. 2D, and placed so as the bottle is above the piercing element and grid, as described in relation to FIGS. 2B-D. The bottle of pH balancing solution, having been aligned, is depressed onto the piercing element and the bottle is pierced so as to allow the pH balancing solution to drain in method step 3300 and flow over the piercing element and the grid. The bottle contents drains into the lower portion of the dispensing unit in the exemplary embodiments shown. The cap is replaced in 3400. The bottle may be removed or left in place in different embodiments of the instant invention. In addition, an optional step may be included, step 3500, to program or reset the parameters of the pH balance monitoring and adjustment device.

FIG. 2F provides a flow chart showing an exemplary method of operating an embodiment of the instant invention. The exemplary method of operating the system for controlling the pH balance of a body of water or pool within a given range can include the following steps as described herein below in detail. The method steps may be executed in any order and additional or fewer steps may be utilized without departing from the spirit of the invention. The pH system is powered on in a first step 1500. The amount of dispensed pH balancing solution is set to zero or adjusted to a preset or previously known number. The pH balancing system communicates with a chlorinator or chlorinator controller or SmSCGC controller in step 1510. The pH balancing system and the controller send and store information to each other. This information includes any existing chlorinator or SmSCGC generator time variable(s) and relevant performance and/or operating parameters.

When the chlorinator or SmSCGC is turned on to produce chlorine, for example through electrolysis, the "power on" time is continuously measured and the pH system calculates an estimate of the pH of the body of water, typically water in a pool in step 1520. Based on the calculation, the pH balancing system makes a decision to dispense or not to dispense in step 1530. If the negative branch is chose it loops back to the previous step and continues to measure the "power on" variables and calculate an estimated pH in branch 1535. Once the affirmative branch is chosen in branch 1540, based on the estimated pH and other suitable variables, a measured dose of pH balancing solution is dispensed into the body of water or pool at a known rate. However, first an additional check on available pH balancing solution is made in step 1550. A decision is made to send an alert if there is a low level of solution, represented by the positive branch, which leads to an alert step 1560. If the solution level is sufficient, the negative branch leads to a dispensing step 1570, where a measured dose of pH balancing solution is dispensed and this amount is communicated back to the pH dispensing unit or system. The method can then loop the system back to the calculation step 1520 or a separate calculation of the adjusted pH can be made following dispensing (not shown) and the system loop through the dispensing steps 1510-1570 again. Thus the pH is again estimated after the addition of pH balancing solution and the system may continue through steps 1510-1570 to dispense additional pH balancing solution as needed until the estimates indicate that the pH is in a desired range, at which point the system can go back to simply monitoring the data from the smart salt chlorine generator cell.

FIGS. 3A and 3B show a plan view of a further exemplary embodiment including a salt-chlorine generator cell blade cleaning feature in a closed and a normal operating position. In this further embodiment, the invention utilizes an actuated three-way valve 650 and separate piping loop 700 for chlorination of incoming water. The three-way actuated valve 650 normally diverts water into the loop having a smart salt chlorine generator cell 100 and then into the return plumbing line, as shown in FIG. 3B representing the "normal" operating mode passing water past the smart salt chlorine generator cell 100 and loop 700. In this case, the system monitors and dispenses chlorine in the incoming water and calculates an estimated pH based on the operation time of the smart salt chlorine generator cell 100, similar to the operation of the embodiment of FIG. 1. The smart salt chlorine generator cell controller 90 of the exemplary embodiment of FIGS. 3A and 3B also monitors the efficiency of the smart salt chlorine generator cell 100 and its electrolysis blades. The monitoring can be done directly or indirectly without departing from the spirit of the invention. A typical source for a decrease in efficiency, for example, in electrolytic salt chlorine generators is the build up of scale on the electrolysis blades.

FIG. 3A shows a plan view of a further exemplary embodiment including a salt-chlorine generator cell blade cleaning feature in a closed operating position to allow for cleaning. As such, a feature of the exemplary embodiment as shown in FIG. 3A is to use the addition of the pH balancing solution in the closed loop to chemically wash the blades with the solution for a prolonged period of time and thereby clean them. Although the simple addition of the pH balancing solution upstream of the smart salt chlorine generator cell 100, as shown, assists in retarding the onset of scale buildup, the pH solution is not allowed to remain in contact with the blades to actually wash them. In the embodiment of FIGS. 3A and 3B, after a period of time or during regular periods of admission of the pH balancing solution 230 by the pH monitoring and balancing unit controller 210, the three-way valve 650 is shut to stop the flow of water within the chlorinator loop 700 as shown in FIG. 3A. No chlorination is being conducted at this time and, therefore, no electrolysis is occurring so no water flows into the loop 700. The principal flow is diverted straight through to the pool in the return line 110. The loop 700 remains "wet" with a specific volume of water trapped within it.

The signal to close the chlorinator loop 700 from the incoming water may also be issued from the smart salt chlorine generator cell controller 90 alone or in conjunction with a signal from the smart salt chlorine generator cell controller 90 to the pH monitoring and balancing unit controller 210 or alternatively be coordinated from an external master controller (not shown). The pH balancing solution 230 is measured as in the embodiment of FIG. 1 and then admitted from the pH solution dispensing device 220 as disclosed above in relation to FIG. 1. The pH balancing solution 230 can be, but is certainly not limited to, an acid solution like muriatic acid as noted above. The pH monitoring and balancing unit controller 210 can also wait and accumulate the demand for a specifically larger amount of acid required to reduce the pH for the pool that would also be sufficient to clean the blades of the smart salt chlorine generator cell 100. It would then only add the pH balancing solution 230 when enough of a demand has accumulated to properly clean the smart salt chlorine generator cell 100.

In either case, at this point, the pH monitoring and balancing unit controller 210 can activate the dispensing device 220 and add the pH balancing solution into the chlorinator loop 700. The added solution is allowed to diffuse into the water that remains in the chlorinator loop 700 and is in intimate contact with the smart salt chlorine generator cell 100 and its blades for a prolonged period of time. The blades are thereby chemically washed by the remaining water and pH balancing solution 230. After a set period of time the pH monitoring and balancing unit controller 210 or the smart salt chlorine generator cell controller 90 or a master controller (not shown) switches the actuated three way valve 650 into its "normal" chlorine generating mode as shown in FIG. 3B and returns to normal operation of the chlorinator as described herein below.

This cleaning maintains the smart salt chlorine generator cell 100 at peak performance, extends its life, and reduces its power consumption without requiring any user input and simultaneously continues to monitor and maintain the pH balance. It should be noted that the end opposite the inlet line in the chlorinator loop 700 can be open and effectively allow built up gasses and any pressure variations to equalize or vent. Alternatively, a check valve could be placed on the return side of the loop to assure a totally closed loop.

FIG. 3B shows a plan view of a further exemplary embodiment including a salt-chlorine generator cell blade cleaning feature in an open operating position where the chlorinator is operating to produce chlorine through electrolysis. In this mode the chlorine levels of the body of water are being increased by the smart chlorine generator 100 as directed by the smart chlorine generator controller 90. The chlorinator conducts electrolysis through its blades, producing chlorine but also producing scale on the electrolysis blades as described above. The pH balancing unit can continue to add solution as needed or wait to build up a need sufficient to chemically wash the blades as described above. In addition to having a mode allowing flow through the loop, a further position of the actuator valve 650 can be provided that allows maximum flow through the entire piping system by permitting water to jet through both the loop 700 and the portion of the return line 110 that is used to bypasses loop 700.

The command to open for maximum flow can be issued from the smart salt chlorine generator cell controller 90 alone or in conjunction with a signal from the smart salt chlorine generator cell controller 90 to the pH monitoring and balancing unit controller 210 or alternatively be coordinated from an external master controller (not shown). The three-way valve 650 is opened just enough to close the chlorine generator flow switch 67 and bypass the rest straight through the pipe to allow for maximum flow with the least restriction within the system. This allows for energy conservation, as the pump requires less pressure due to reduced resistance through the increased volume of pipe. This can include, but is not necessarily limited to, periods of operation where chlorine is not being generated at the blades or where the flow within the return line is sufficiently high in pressure that redirecting the entire flow would not be ideal for chlorine generation. However, it should be noted, both the pH balancing unit and the chlorine generator can continue to operate in both the maximum flow and redirected modes.

Figure 4:
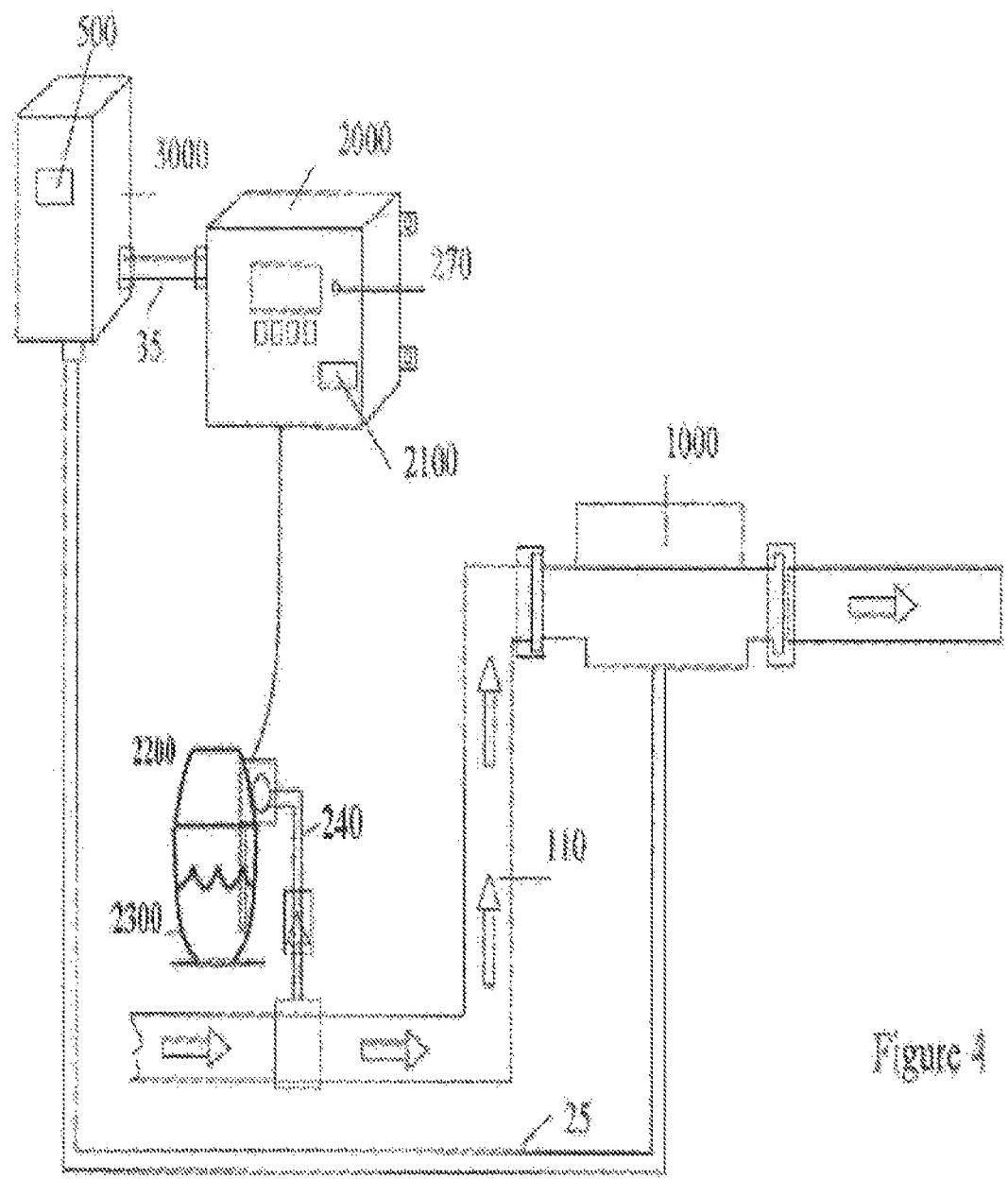
FIGS. 4, 5A, and 5B show plan views of further embodiments of the invention.
Figure 5A:
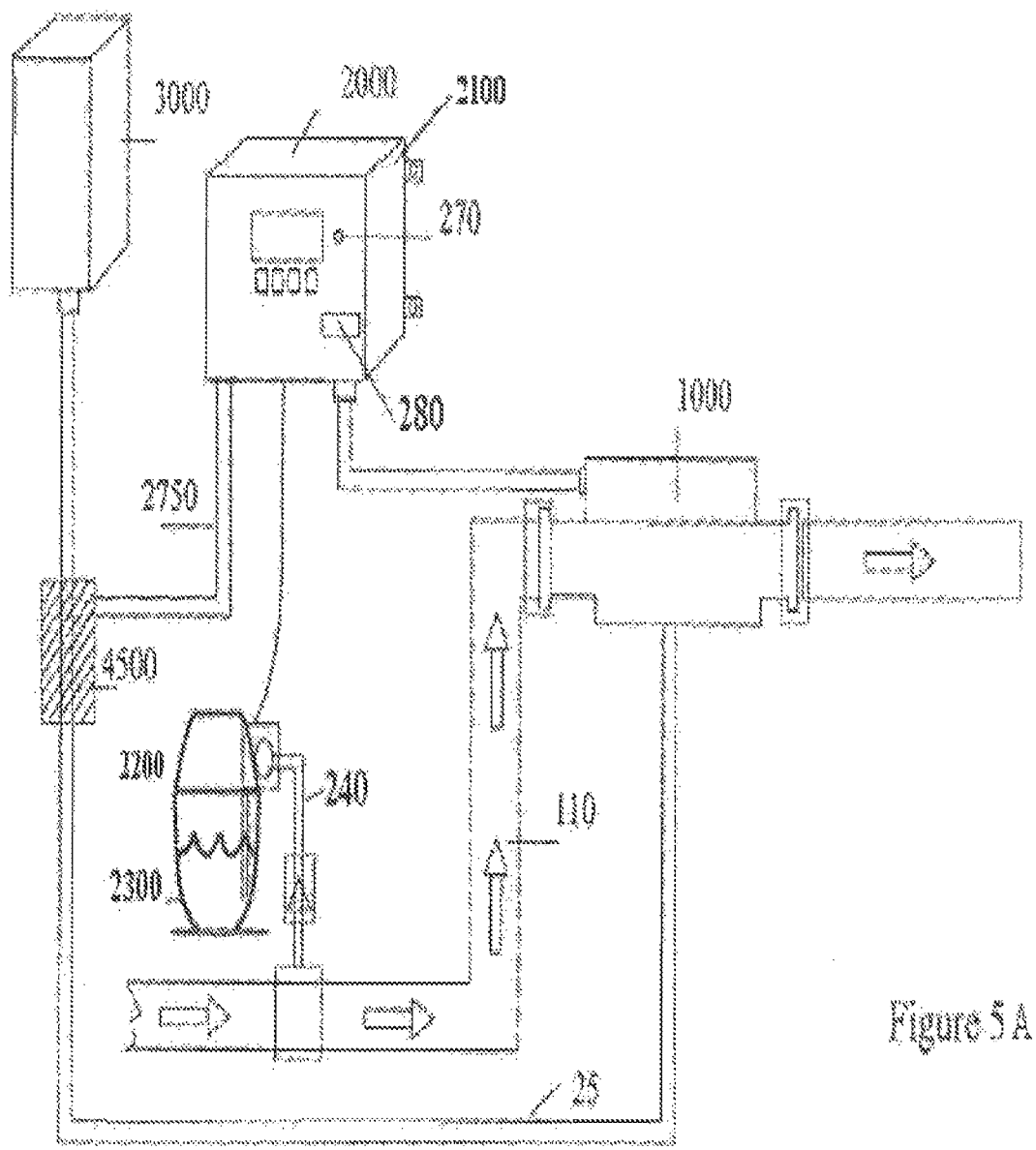
Figure 5B:
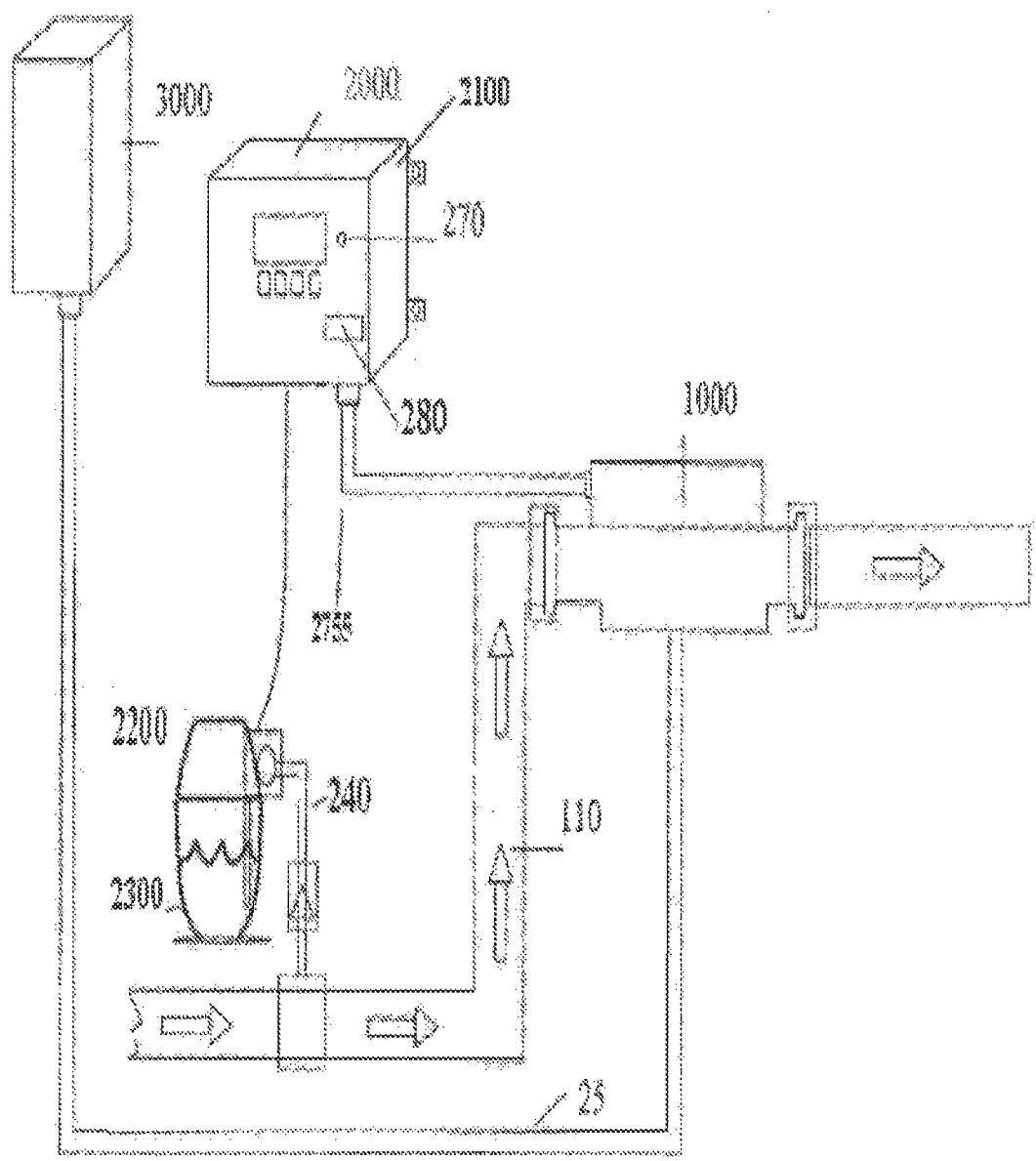

FIGS. 4, 5A, and 5B show plan views of further embodiment of the invention. These embodiments are for pools or spas that do not have the latest smart salt chlorine generator cells installed, but have an alternative salt chlorine generator cell (SCGC) system or another type of chlorine generator 1000. These embodiments provide a stand alone version of the pH monitoring and balancing unit 200 described above in relation to the other embodiments with either a "smart" or programmable power supply controller 500, as in FIG. 4, or additional power monitoring elements 4500, as described below in relation to FIG. 5

With respect to FIG. 4, in the embodiment shown, a "smart" or programmable power supply controller 500, capable of measuring and reporting power consumption and demand, provides power to the pH monitoring and balancing unit 2000 and the chlorine generator 1000 on the same circuit, allowing the power consumption of the chlorine generator 1000 to be measured by the smart power supply controller 500. The power supply 3000 is coupled to the pH monitoring and balancing unit 2000 via coupling 35 and to the chlorine generator via coupling 25.

With respect to FIG. 5A, in instances where a "smart" power supply is not available, a power monitoring element 4500, such as an inductor coil or similar sensor capable of detecting a flow of energy into the chlorine generator 1000, can be provided and attached at a point where it can obtain the necessary data on the "on time" or time the salt chlorine generator 1000 as it receives power and is in operation. In this instance, the monitoring element is shown coupled to the coupling 25 connecting the power supply 3000 to the chlorine generator 1000. The power monitoring element 4500, here an inductive sensing device, senses the electrical load increase via the increase in inductance within the existing power supply wire or cord 25. This can then be used to calculate the operational time or "on time" of the chlorine generator 1000. The measured data from the monitoring element 4500 could then be communicated back via line 2750 to the pH monitoring and balancing unit 2000. This permits the pH monitoring and balancing unit 2000 to operate on any power supply and any chlorine generator 1000, so long as the power going to the chlorine generator 1000 has a known ratio for power to chlorine production output and this can be measured by the power monitoring element 4500.

FIG. 5B shows a further plan view a further embodiment of the invention. In yet a further exemplary embodiment, the pH balancing unit 2000 is linked directly to the salt chlorinator system 1000. The components of the embodiment of FIG. 5B are substantially identical to FIG. 5A and includes a power supply 3000, a pH solution balancing unit 2000, a pH balancing and dispensing unit controller 2100, and a chlorinator 1000. In this embodiment, no sensing or monitoring element 4500 is provided as compared with the embodiment of FIG. 5A. Instead, the quantities of pH balancing solution 230 needed for balancing the pH is statistically determined by the controller 2100. A statistical calculation is made using lookup tables or other programmed equations representing calculations of pH based on input variables. This can be done in conjunction with a timer (see FIG. 7) and can be based as on, for instance, stored "on time" data for the chlorinator 1000. The advantage being the chlorinator may be a salt chlorine or other type of chlorinator or sanitizer with a measurable output. The programming may utilize, for example, the salt chlorinator 1000 output and settings and/or additional variables like the pool or water body size, temperature, air temperature and the like, these variables can be manually entered or communicated, for example via RS485 line 2755 or wirelessly, and sent from the salt chlorinator to the pH dispensing and balancing system. The dispensing and balancing system controller 2100 can compute an initial dispense rate from this information and automatically regulate the dispensed amount of pH balancing solution 230. In addition, the unit will also hold historical dispense data which will allow for automatic optimization of the dispensed amounts based on the stored historic variables and results.

In FIGS. 4, 5A and 5B, the pH monitoring and balancing unit controller 2100 computes an estimated pH level based on the production of the chlorine generator 1000 as explained in relation to the embodiment of FIG. 1 and the variables discussed therein. The relative pH level of the water is determined mathematically by the amount of chlorination being done by the chlorine generator 1000 as a function of its operational time or "on time" or through statistically based computations as previously noted. The pH monitoring and balancing unit 2000, through its controller 2100 and the software contained thereon, can then compute the appropriate metering of the pH balancing solution 2300 based on this information and the dispensing mechanism 2200 can then dispense the solution in the needed amounts. The dispensing mechanism 2200 dispenses solution through line 240 into the return line 110. Finally, if no additional pH balancing solution 2300 is needed, the system goes back to monitoring the power going to the chlorine generator 1000.

The controller 2100 and its software can account for variations in make and model of chlorine generator 1000 and, as the system functions, can record and account for specific variations in the specific chlorine generator it is servicing. This data can be stored in memory devices within the controller or can otherwise be programmed into the pH monitoring and balancing unit 2000 at installation from an external data source. Additional variables used in calculating the output of the SCGC or other chlorine generator include water body volume, precipitation, water temperature, air temperature, sunlight hours, voltage, average power variance, and similar variables. With the input variables, the controller 2100 calculates the operational time or "on time" of the SCGC or other chlorinator 1000. From this "on time" or operational time variable, the pH of the body of water or pool or pool is estimated and an adjustment requirement is determined and this in turn determines the set amounts of pH balancing solution to be dispensed by the dispensing mechanism 2200 or via the statistical method previously discussed.

FIG. 6 is a flow chart describing an exemplary method of operating an embodiment of the instant invention. A "smart" or programmable power supply controller 500 is coupled to a chlorine generator 1000 and a pH balancing and monitoring unit 2000 or a monitoring element 4500 is provided to report power consumption of a chlorine generator 1000 to a pH balancing and monitoring unit 2000 such that the power consumption of the salt chlorine generator 1000 can be monitored in either case. The flow chart for the exemplary method of operating the embodiment begins with powering on a pH monitoring and balancing unit 2000 in step 6000.

The amount of dispensed pH balancing solution is set to zero or a previously determined starting level. Power is provided to the chlorine generator 1000 when demanded and monitored by the pH monitoring and balancing unit 2000 in step 6100. The pH monitoring and balancing unit 2000 monitors for a "power on" signal from programmable power supply controller 500 or power monitoring element 4500 indicating that power is being provided to the chlorine generator 1000 and it is operating. The pH monitoring and balancing unit 2000 receives the "power on" signal and stores the total "on time" in step 6200. It then calculates an estimated level of chlorine production based on the "on time" in step 6300.

Based on these calculations an estimated pH based on the "on time" or operational time of the chlorine generator 1000 is made. If the pH is within a set range, the method of operation returns to the monitoring step 6100. If the pH is not within the set range, the pH monitoring and balancing unit 2000 is operated to dispense pH balancing solution 2300 at predetermined rate in step 6400. Once the calculated amount of pH balancing solution has been added to the water, the amount used is stored as a variable within the pH monitoring and balancing unit 2000 in step 6500. A decision step 6600 determines if the calculated remaining solution is nearing a preset "low" level. A further step in the method notifies a user, maintenance or owner to the lack of the low level of pH balancing solution if the calculation determines the amount is nearing the preset low level in step 6700. Otherwise, the method loops back to the monitoring step.

Figure 7:
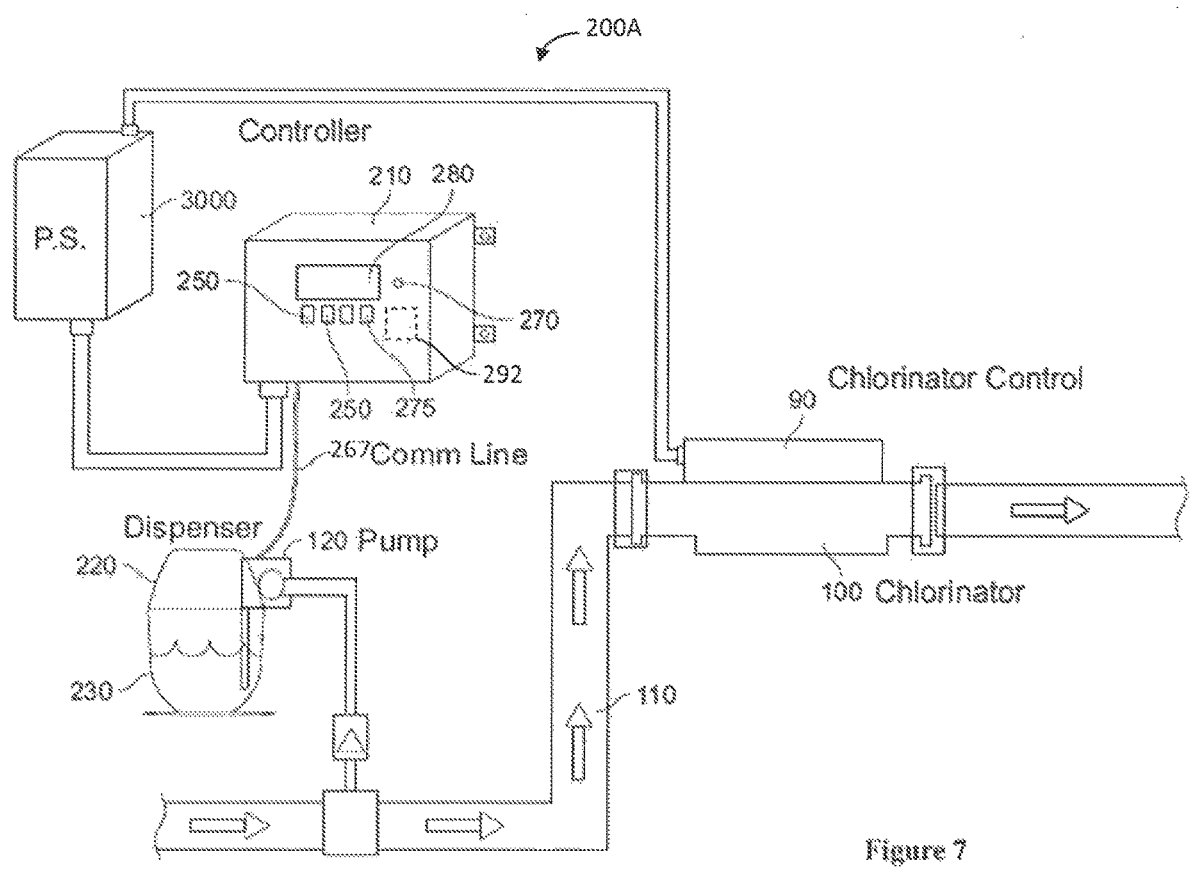
FIG. 7 shows a further plan view of another embodiment of the invention.

FIG. 7 provides a plan view of a further exemplary embodiment of the pH balancing solution dispenser and chlorinator. The further exemplary embodiment does not require communications from the salt chlorine generator 100. The components of this exemplary embodiment would be substantially the same as FIGS. 1-6 above, providing a power supply 3000, a pH dispensing system 200A and a chlorinator 100 and chlorinator controller 90. In this instance, however, no communications are facilitated as between the power supply 3000, the pH balancing dispensing system 200A, or the chlorinator 100 regarding variables. Instead, the exemplary embodiment shown simply requires the input of variables that can include the make and model of the chlorinator or the base chlorine outputs of the chlorinator on a timed basis or other appropriate variables as discussed above in relation to other embodiments. This can also include additional variables such as a high limit, a low limit and a median limit on the stated output, the volume of the pool or body of water or similar variables specific to the installation that would affect the need for dispensing pH balancing solution. This can then be set to provide an output based simply on a timer that is synchronized or coordinated with the chlorinator. The timer 292 can be provided at the pH dispensing system controller 210 and accessed and programmed through adjustment devices 250, buttons 275, and the programmable interface display 280. Similarly, adjustment to the output and input of variables would be facilitated with the interface of the adjustment devices 250, buttons 275, and the programmable interface display 280. A communication line 267 would extend from the controller 210 to the pump 120.

In addition, a variation of the exemplary embodiment can provide a simple switch (not shown) in the power supply 3000 to halt operation of the chlorinator when the dispensing mechanism 220 is operating and restart the chlorination and the timer 292 for the next dispensing cycle in controller 2100 when the pH balancing solution is finished dispensing.

The embodiments and examples discussed herein are non-limiting examples. The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method of adding pH balancing solution to a body of water, the method comprising:
    coupling a pH balancing solution system to a circulation system in communication with the body of water, the pH balancing solution system including a pH balancing solution dispenser having an upper body portion, a lower body portion, an interior support portion with a dispensing grid and a piercing mechanism thereon, and a dispenser lid;
    opening the dispenser lid and inserting a pH balancing solution container inside of the upper body portion;
    situating the pH balancing solution container on the piercing mechanism and piercing the pH balancing solution container on the piercing mechanism to open the pH balancing solution container;
    allowing the open pH balancing solution container to drain over the dispensing grid; and
    dispensing a metered dose of pH balancing solution to the body of water through the pH balancing solution system.

2. The method of claim 1, further comprising programming a controller to establish an initial pH of the body of water and programming the controller with variables for a statistical estimation of a quantity of chlorination performed by a chlorinator.

3. The method of claim 2, wherein the variables include at least one of a volume of the body of water, a chlorine output of the chlorinator, a make and model of the chlorinator, a base chlorine output of the chlorinator, an operation time of the pH balancing solution system, an operational time of the chlorinator, dispensing device status, sunlight hours, voltage, average power variance, measured dosage of pH balancing solution dispensed, a measured rate of dispensing pH balancing solution, water temperature, air temperature, measured precipitation, and a timer.

4. A method of operating a pH balancing system for controlling pH balance of a body of water, the method comprising:
    coupling the pH balancing system to a chlorinator so that a controller of the chlorinator is in communication with the pH balancing system;
    measuring an operational time of the chlorinator;
    calculating a pH of the body of water based at least in part on the operational time of the chlorinator;
    comparing the pH of the body of water to a preset range to determine whether the pH of the body of water falls within the preset range;
    dispensing a metered dose of a pH balancing solution to the body of water when the pH of the body of water falls outside of the preset range; and
    communicating the dispensed amount of the pH balancing solution to the pH balancing system.

5. The method of claim 4, wherein the chlorinator produces chlorine through electrolysis.

6. The method of claim 4, wherein the body of water is a pool.

7. The method of claim 4, wherein the pH balancing system and the controller store and send performance and operational parameters to each other.

8. The method of claim 7, wherein the performance and operational parameters include at least one of a volume of the body of water, a chlorine output of the chlorinator, a make and model of the chlorinator, a base chlorine output of the chlorinator, an operational time of the pH monitoring and balancing unit, an operational time of the chlorinator, dispensing device status, sunlight hours, voltage, average power variance, measured dosage of pH balancing solution dispensed, a measured rate of dispensing pH balancing solution, water temperature, air temperature, measured precipitation, and a timer.

9. The method of claim 4, wherein the pH of the body of water is continuously calculated until the pH of the body of water falls outside of the preset range.

10. The method of claim 4 and further comprising calculating a level of pH balancing solution prior to dispensing the metered dose of the pH balancing solution.

11. The method of claim 10, and further comprising sending an alert if the level of pH balancing solution falls below a threshold amount.

12. The method of claim 4 and further comprising:
    recalculating the pH of the body of water following the dispensing of the metered dose of the pH balancing solution; and
    comparing the recalculated pH to the preset range to determine whether the recalculated pH falls within the preset range.

13. The method of claim 12, and further comprising dispensing a second metered dose of the pH balancing solution and communicating the second dispensed amount of the pH balancing solution to the pH balancing system.

14. A method of operating a pH balancing system for a body of water, the method comprising:
    coupling a power supply controller of the pH balancing system to a chlorine generator and a monitoring unit to monitor a power consumption of the chlorine generator, the chlorine generator including a controller in communication with the pH balancing system;
    adjusting the pH balancing system to set a first metered dose of a pH balancing solution;
    providing power to the chlorine generator;
    monitoring the chlorine generator for a power on signal indicating that the chlorine generator is operational;
    measuring an operational time of the chlorine generator using the monitoring unit;
    calculating a pH of the body of water based at least in part on the operational time of the chlorine generator;
    comparing the pH of the body of water to a preset range to determine whether the pH of the body of water is within the preset range;
    dispensing a second metered dose of the pH balancing solution to the body of water when the pH of the body of water falls outside of the preset range to balance the pH of the body of water; and
    communicating a dispensed amount of the pH balancing solution to the pH balancing system.

15. The method of claim 14, wherein the first metered dose of the pH balancing solution is set to zero.

16. The method of claim 14, wherein the body of water is a pool.

17. The method of claim 14, wherein the monitoring unit continuously measures the operational time and the pH of the body of water is continuously calculated until the pH of the body of water falls outside of the preset range.

18. The method of claim 14, and further comprising calculating a level of pH balancing solution after dispensing the second metered dose of the pH balancing solution.

19. The method of claim 18, and further comprising sending an alert when the level of pH balancing solution falls below a threshold amount.

20. The method of claim 14, and further comprising:
recalculating the pH of the body of water following the dispensing of the second metered dose of the pH balancing solution; and
comparing the recalculated pH to the preset range to determine whether the recalculated pH falls within the preset range.

* * * * *